United States Patent [19]

Gotou

[11] Patent Number: 4,692,645

[45] Date of Patent: Sep. 8, 1987

[54] ROTATING ELECTRIC MOTOR WITH REDUCED COGGING TORQUE

[75] Inventor: Makoto Gotou, Nishinomiya, Japan

[73] Assignee: Matsushita Electric Industrial Co., Ltd., Kadoma, Japan

[21] Appl. No.: 753,964

[22] Filed: Jul. 11, 1985

[30] Foreign Application Priority Data

Jul. 11, 1984 [JP] Japan .................. 59-144902
Jul. 11, 1984 [JP] Japan .................. 59-144903
Jul. 31, 1984 [JP] Japan .................. 59-161710

[51] Int. Cl.$^4$ .............................................. H02K 3/00
[52] U.S. Cl. ..................... 310/184; 310/156; 310/198; 310/216
[58] Field of Search ............ 310/180, 184, 68 R, 310/156, 198–207, 185–187, 46, 216, 259

[56] References Cited

U.S. PATENT DOCUMENTS

| | | | |
|---|---|---|---|
| 3,230,434 | 1/1966 | Bauerlein | 310/156 |
| 3,235,762 | 2/1966 | Brammerlo | 310/185 |
| 3,845,334 | 10/1974 | Harada | 310/156 |
| 3,942,055 | 3/1976 | Hoffmeyer | 310/184 |
| 4,130,769 | 12/1978 | Karube | 310/156 |
| 4,163,915 | 8/1979 | Fong | 310/198 |
| 4,280,072 | 5/1978 | Gotou et al. | 310/67 R |
| 4,341,970 | 7/1982 | Auinger | 310/184 |

FOREIGN PATENT DOCUMENTS 55-71163  5/1980  Japan .
0050563   6/1941  Netherlands ............ 310/216

OTHER PUBLICATIONS

"An Analysis of the Cogging Torque of a DC Motor and a New Reducing Technique", Gotou, Makoto, Member & Kazutsugu Kobayashi, Member (Wireless Research Lab, Matsushita), pp. 711–718.

*Primary Examiner*—R. Skudy
*Attorney, Agent, or Firm*—Wenderoth, Lind & Ponack

[57] ABSTRACT

A rotating electric motor has a permanent magnet member of a circular form and an armature core made of a magnetic material. The permanent magnet member has a plurality of N and S poles positioned alternately around the rotary axis of the motor, and the number of the poles is P which is an even number. The armature core has a plurality of teeth formed between two adjacent winding slots of the armature core, and the number of the teeth is T which is an integer not less than 2P. Overlapping winding coils of polyphase winding groups are wound in the winding slots of the armature core, and the number of the phases of the polyphase winding groups is H which is an integer not less than 2. The armature core has at least one short-block and one long-block, each of which consists of a group of teeth having at least two teeth positioned sequentially. The short-block has at least one short-tooth, and at least one standard-tooth and no long-teeth, and the long-block has at least one long-tooth, at least one standard-tooth and no short-teeth, where the effective pitch of the standard-teeth is equal to D=(360/T) degrees and, the effective pitches of the short-teeth are smaller than D and the effective pitches of the long-teeth are larger than D. Because of the above arrangement, the phases of the winding slots of the armature core with a period of 1 pole pitch of the permanent magnet member are different with respect to each other, and the cogging torque of the rotating electric motor is small.

58 Claims, 24 Drawing Figures

WINDING GROUP A (A1, A2, A3, A4)
WINDING GROUP B (B1, B2, B3, B4)
WINDING GROUP C (C1, C2, C3, C4)

ROTATING ELECTRIC MOTOR WITH REDUCED COGGING TORQUE

BACKGROUND OF THE INVENTION

1. Field of the Invention

This invention relates to a rotating electric motor, and more particularly to a rotating electric motor comprising an armature core made of a magnetic material and having a plurality of teeth and a plurality of overlapping winding coils of polyphase winding groups, and a field permanent magnet member which is arranged to have a plurality of alternating N and S poles which are opposed to said teeth of the armature core, the number of N and S poles being P which is an even number, and the number of teeth being T which is an integral multiple of P and is not less than 2P.

2. Description of the Prior Art

A rotating electric motor comprising an armature core of magnetic material having a plurality of teeth and a field permanent magnet member having magnetized poles opposed to the teeth is widely used since it has high efficiency. But in the prior art there is a problem that a harmful vibration occurs due to an intense cogging torque generated by the interaction between the magnetized poles of the permanent magnet and the teeth of the armature core. This cogging torque prevents a smooth rotation of the rotating electric motor. In order to reduce the cogging torque, a skewed armature core is used in some cases. But, it is difficult to make the skewed armature core, and the cogging torque is not adequately reduced. The use of an armature core having no teeth for getting a smooth rotation is not practical because of its low efficiency, which necessitates a large motor size.

A construction of a rotating electric motor with reduced cogging torque is disclosed in the specification of U.S. Pat. No. 4,280,072 or the specification of Japanese Laid-open (unexamined) Patent No. 55-71163. In these patent specifications, indented portions are used to reduce cogging torque. This method is very effective in the case where the number of teeth T is smaller than twice the number P of the N and S poles (that is, T<2P), such as the rotating electric motors shown in FIG. 1, FIG. 5 and FIG. 6 of U.S. Pat. No. 4,280,072, since the face of each of the teeth is wide enough to provide thereon a number of indented portions. But, the cogging torque of a rotating electric motor such as that shown in FIG. 8 of U.S. Pat. No. 4,280,072, in which T is not less than 2P, is not sufficiently reduced by the above method (the same rotating electric motor is disclosed in Japanese Laid-open Patent No. 55-71163).

The conventional rotating electric motor will be described in detail hereinbelow.

FIG. 1 is a schematic sectional view of a conventional rotating electric motor with the relationship T=6P, wherein T is the number of teeth of the armature core and P is the number of pulses of the field permanent magnet. In FIG. 1, a cylindrical permanent magnet 3 is fixed to the outer circumference of a rotor 2 made of a magnetic material, and the permanent magnet 3 rotates with the rotor 2 around a rotary axis (shaft) 1. The permanent magnet 3 has 4 poles of alternating N and S poles positioned apart by equal angles of 90 degrees, that is, P=4. The teeth 6 of an armature core 4, each of which is formed between two adjacent winding slots 5, are faced to the poles of the permanent magnet 3. The rotary shaft 1 of the rotor 2 is rotatably supported by the armature core 4. Therefore, the relative position between the teeth 6 of the armature core 4 and the poles of the permanent magnet 3 changes according to the rotation of the rotor 2.

FIG. 2 shows a development view of the conventional motor of FIG. 1 developed at the lines X—X' and Y—Y', when these lines are in a line. The armature core 4 has 24 winding slots a to x a spaced apart by equal angles of 15 degree, and 24 teeth are provided between two adjacent winding slots, that is, T=24. Overlapping winding coils A1, A2, A3, A4, B1, B2, B3, B4, C1, C2, C3 and C4 are wound in the winding slots a to x. Each of the winding coils A1 to C4 encircles 5 of the teeth of the armature core 4. That is, A1 is wound in the winding slots a and f, A2 is wound in the winding slots g and l, A3 is wound in the winding slots m and r, A4 is wound in the winding slots s and x, B1 is wound in the winding slots e and j, B2 is wound in the winding slots k and p, B3 is wound in the winding slots q and v, B4 is wound in the winding slots w and d, C1 is wound in the winding slots i and n, C2 is wound in the winding slots o and t, C3 is wound in the winding slots u and b, and C4 is wound in the winding slots c and h. The winding coils A1,A2,A3 and A4 are connected in series to form a winding group A of a first phase, the winding coils B1,B2,B3 and B4 are connected in series to form a winding group B of a second phase, and the winding coils C1,C2,C3 and C4 are connected in series to form a winding group C of a third phase. The phase difference among the winding groups A,B and C is equal to 120el degrees (electrical degrees), where 180el is equivalent to 1 pole pitch of 360/P degrees of the permanent magnet 3. In FIG. 1, if P=4, then 180el is equivalent to 90 degrees (mechanical degrees). Therefore, a torque accelerating the rotor 2 is obtained by supplying three phase currents to the three phase winding groups A, B and C.

FIG. 3 is a schematic sectional view of another conventional rotating electric motor with the relationship T=3P. The structure of the conventional motor shown in FIG. 3 is the same as that of the conventional motor shown in FIG. 1, except for the relationship of T and P, and the winding pitch. A cylindrical permanent magnet 13 is fixed to the outer circumference of a rotor 12 made of a magnetic material, and the permanent magnet 13 rotates with the rotor 12 around a rotary shaft 11. The permanent magnet 13 has 4 poles of alternating N and S poles positioned apart by equal angles of 90 degrees, that is, P=4. The teeth 16 of an armature core 14, each of which is formed between two adjacent winding slots 15, are faced to the poles of the permanent magnet 13. The rotary shaft 11 of the rotor 12 is rotatably supported by the armature core 14. Therefore, the relative position between the teeth 16 of the armature core 14 and the poles of the permanent magnet 13 changes according to the rotation of the rotor 12.

FIG. 4 shows a development view of the conventional motor of FIG. 3 developed at the lines X—X' and Y—Y', when these lines are in a line. The armature core 14 has 12 winding slots a to l spaced apart by equal angles of 30 degrees, and 12 teeth are provided between two adjacent winding slots, that is, T=12. Overlapping winding coils A1, A2, A3, A4, B1, B2, B3, B4, C1, C2, C3 and C4 are wound in the winding slots a to l. Each of the winding coils A1 to C4 encircles 3 of the teeth of the armature core 14. That is, A1 is wound in the winding slots a and d, A2 is wound in the winding slots d and g, A3 is wound in the winding slots g and j, A4 is wound in the winding slots j and a, B1 is wound in the winding slots c and f, B2 is wound in the winding slots f and i, B3 is wound in the winding slots i and l, B4 is wound in the winding slots l and c, C1 is wound in the winding slots e and h, C2 is wound in the winding slots h and k, C3 is wound in the winding slots k and b, and C4 is wound in the winding slots b and e. The winding coils A1,A2,A3 and A4 are connected in series to form a winding group A of a first phase, the winding coils B1,B2,B3 and B4 are connected in series to form a winding group B of a second phase, and the winding coils C1,C2,C3 and C4 are connected in series to form a winding group C of a third phase. The phase difference among the winding groups A,B and C is equal to 120el degrees. In FIG. 3, if P=4, then 180el degrees is equivalent to 90 degrees (mechnical degrees). Therefore, a torque accelerating the rotor 2 is obtained by supplying three phase currents to the three phase winding groups A, B and C.

SUMMARY OF THE INVENTION

An object of the present invention is to provide a noble and improved rotating electric motor of high efficiency with reduced cogging torque.

Another object of the present invention is to provide a rotating electric motor comprising an armature core of a magnetic material having T teeth and a field permanent magnet member having P permanently magnetized N and S poles, where T is not less than 2P, and having reduced cogging torque which is related to the geometry of the armature core and the magnet member.

These objects of the invention can be achieved by a rotating electric motor according to the present invention, which comprises: a field permanent magnet member of a circular form and an armature core made of a magnetic material, said magnet member having permanently magnetized N and S poles being alternately positioned around the rotary axis of said rotary electric motor, the number of said N and S poles being P which is an even number, said armature core having a plurality of teeth arranged between two adjacent winding slots where a plurality of overlapping winding coils of polyphase winding groups are wound, the number of said teeth being T which is not less than 2P, and the number of the phases of said polyphase winding groups being H which is not less than 2, wherein said armature core has at least one short-block and one long-block alternately positioned around said rotary axis, each of said short-blocks has at least one short-tooth, and at least one standard-tooth and no long-teeth, and each of said long-blocks has at least one long-tooth, and at least one standard-tooth and no short-teeth, where the effective pitch of said standard-teeth is equal to $D=(360/T)$ degrees, each of the effective pitches of said short-teeth is smaller than D, and each of the effective pitches of said long-teeth is larger than D.

These objects of the invention are also achieved by providing a rotating electric motor according to the present invention, which comprises a field permanent magnet member of a circular form and an armature core made of magnetic material, said magnet member having permanently magnetized N and S poles alternately positioned around the rotary axis of said rotary electric motor, the number of said N and S poles is P which is an even number, said armature core having a plurality of teeth arranged between two adjacent winding slots where a plurality of overlapping winding coils of polyphase winding groups are wound, the number of said teeth is T which is not less than 2P, and the number of the phases of said polyphase winding groups is H which is not less than 2, wherein said winding slots are positioned at unequal angles so that the number of the phases of said winding slots with a period of 1 pole pitch of said magnet member is larger than 2H.

These objects of the invention are also achieved by providing a rotating electric motor according to the present invention, which comprises a field permanent magnet member of a circular form and an armature core made of a magnetic material, said magnet member having permanently magnetized N and S poles alternately positioned around the rotary axis of said rotary electric motor, the number of said N and S poles is P which is an even number, said armature core having a plurality of teeth arranged between two adjacent winding slots where a plurality of overlapping winding coils of polyphase winding groups are wound, the number of said teeth is T which is not less than 2P, and the number of the phases of said polyphase winding groups is H which is not less than 2, wherein at least one of said teeth has at least one dummy-slot portion opposed to the poles of said magnet member, a plurality of tooth-segments are formed between two adjacent winding slots and dummy-slot portions, the number of said tooth-segments is Tt which is larger than T, said armature core has at least one short-block and one long-block alternately positioned around said rotary axis, each of said short-blocks has at least one short-segment, and at least one standard-segment and no long-segment, and each of said long-blocks has at least one said long-segment, and at least one said standard-segment and no said short-segment, where the effective pitch of said standard-segments is equal to $D=(360/Tt)$ degrees, each of the effective pitches of said short-segments is smaller than D, and each of the effective pitches of said long-segments is larger than D.

These objects of the invention are also achieved by providing a rotating electric motor according to the present invention, which comprises a field permanent magnet member of a circular form and an armature core made of a magnetic material, said magnet member having permanently magnetized N and S poles alternately positioned around the rotary axis of said rotary electric motor, the number of said N and S poles is P which is an even number, said armature core having a plurality of teeth arranged between two adjacent winding slots where a plurality of overlapping winding coils of polyphase winding groups are wound, the number of said teeth is T which is not less than 2P, and the number of the phases of said polyphase winding groups is H which is not less than 2, wherein at least one of said teeth has at least one dummy-slot portion opposed to the poles of said magnet member, a plurality of tooth-segments are formed between two adjacent winding slots and dummy-slot portions, the number of said tooth-segments is Tt which is larger than T, said winding slots and said dummy-slot portions are positioned at unequal angles so that the number of the phases of said winding slots and said dummy-slot portions with a period of 1 pole pitch of said magnet member is larger than $2H(Tt/T)$.

These and other objects and features of the invention will be apparent from consideration of the detailed description of the present invention together with the accompanying drawings, in which:

EMBODIMENTS OF THE INVENTION WITH THE RELATIONSHIPS T=6P

Figure 1:
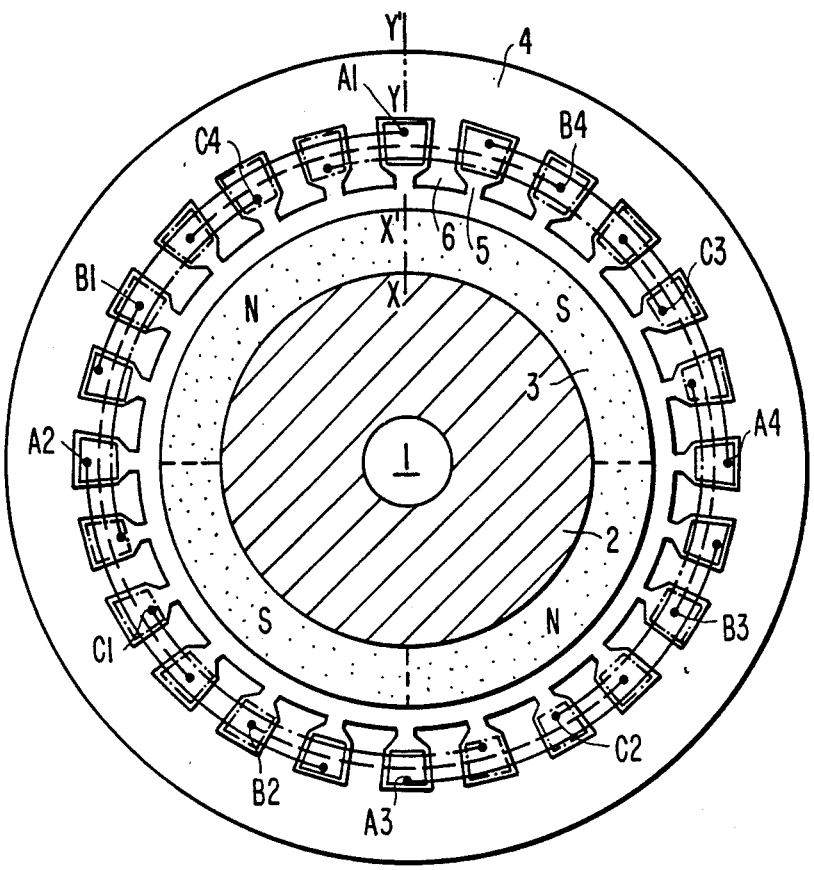
FIG. 1 is a schematic sectional view of a conventional rotating electric motor with the relationship T=6P.
Figure 2:
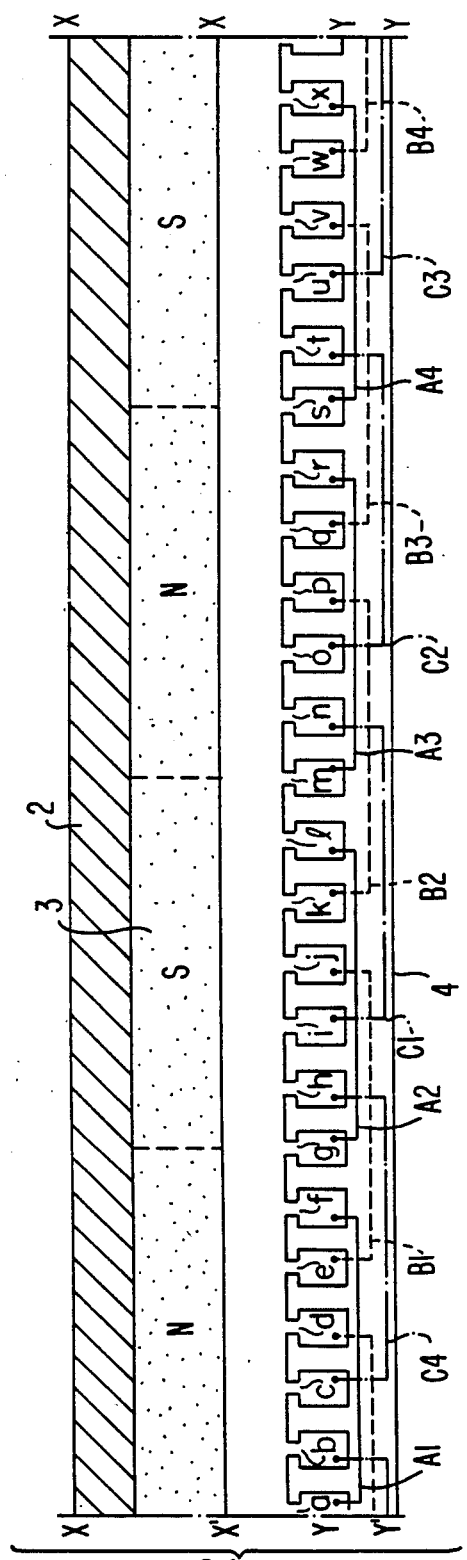
FIG. 2 shows a development view of the conventional rotating electric motor of FIG. 1 developed at the lines X—X' and Y—Y'.
Figure 5:
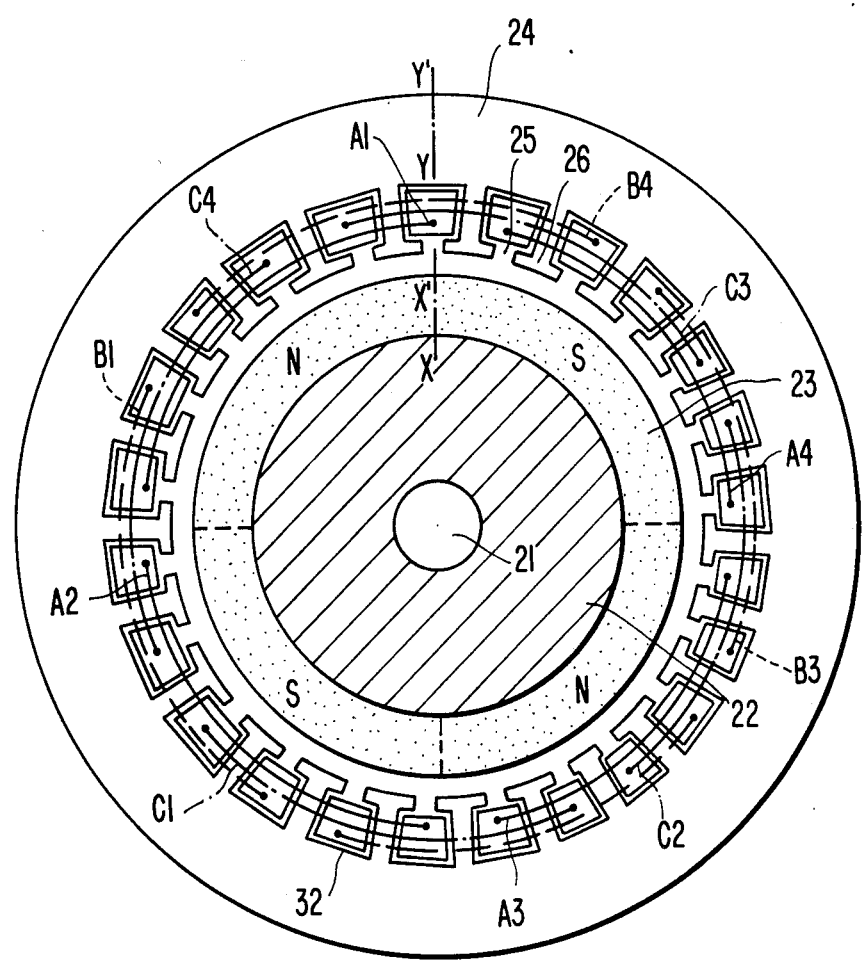
FIG. 5 is a schematic sectional view of an embodiment of the rotating electric motor of the present invention with relationship T=6P.
Figure 6:
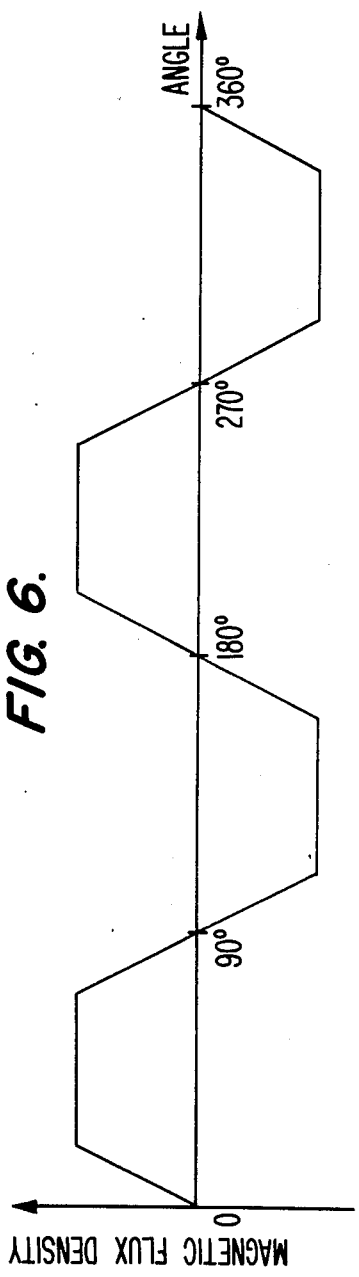
FIG. 6 shows a distribution of the magnetic flux density of the permanent magnet shown in FIG. 5.

FIG. 5, FIG. 6, FIG. 7, FIG. 8 and FIG. 9 shows a brushless DC motor of the present invention with the relationship T=6P, wherein T is the number of teeth of the armature core and P is the number of poles of the field permanent magnet, which corresponds to the conventional rotating electric motor shown in FIG. 1 and FIG. 2. FIG. 5 is a schematic sectional view of the brushless DC motor of the present invention. In FIG. 5, a cylindrical permanent magnet 23 is fixed to the outer circumference of a rotor 22 made of a magnetic material, and the permanent magnet 23 rotates with the rotor 22 around a rotary axis 21. The permanent magnet 23 has 4 poles of alternating N and S poles positioned at equal angles of 90 degrees, that is, P=4, where P is the number of the poles of the permanent magnet 23. FIG. 6 shows a distribution of the magnetic flux density of the permanent magnet 23. The teeth 26 of an armature core 24, each of which is formed between two adjacent winding slots 25, are faced to the poles of the permanent magnet 23. The rotary axis 21 of the rotor 22 is rotatably supported by the armature core 24. Therefore, the relative position between the teeth 26 of the armature core 24 and the poles of the permanent magnet 23 changes according to the rotation of the rotor 22.

Figure 7:
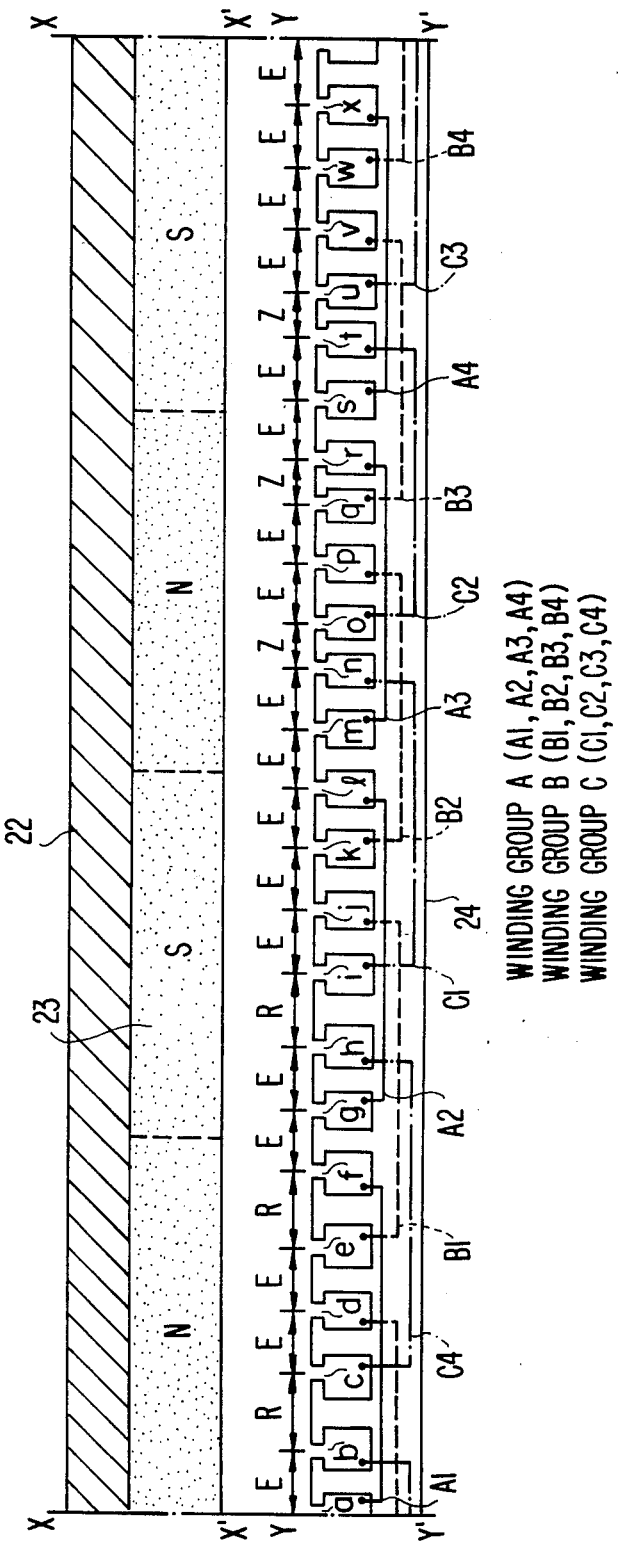
FIG. 7 shows a development view of the rotating electric motor of the present invention of FIG. 5 developed at the lines X—X' and Y—Y'.

FIG. 7 shows a development view of the brushless DC motor of the invention to FIG. 5 developed at the lines X—X' and Y—Y', when these lines are in a line. The armature core 24 has 24 of the winding slots a, b, c, d, e, f, g, h, i, j, k, l, m, n, o, p, q, r, s, t, u, v, w and x, and 24 of the teeth are provided between two adjacent winding slots, that is, T=24, where T is the number of the teeth of the armature core 24. Overlapping winding coils A1, A2, A3, A4, B1, B2, B3, B4, Cl, C2, C3 and C4 are wound in the winding slots a to x. Each of the winding coils A1 to C4 encircles 5 of the teeth of the armature core 24. That is, A1 is wound in the winding slots a and f, A2 is wound in the winding slots g and l, A3 is wound in the winding slots m and r, A4 is wound in the winding slots s and x, B1 is wound in the winding slots e and j, B2 is wound in the winding slots k and p, B3 is wound in the winding slots q and v, B4 is wound in the winding slots w and d, C1 is wound in the winding slots i and n, C2 is wound in the winding slots o and t, C3 is wound in the winding slots u and b, and C4 is wound in the winding slots c and h. The winding coils A1,A2,A3 and A4 are connectd serially to form a winding group A of the first phase, the winding coils B1,B2,B3 and B4 are connected serially to form a winding group B of the second phase, and the winding coils C1,C2,C3 and C4 are connected serially to form a winding group C of the third phase. As described after, the phase differences among the winding groups A,B and C are exactly equal to 120el degrees (electrical degrees), where 180el is equivlent to 1 pole pitch of (360/P) degrees. In FIG. 5, P=4, then 180el is equivalent to 90 degrees (mechnical degrees), which is the same as that of the conventional motor of FIG. 1. Therefore, a torque accelerating the rotor 22 is obtained by supplying three phase currents to the three phase winding groups A, B and C.

Figure 8:
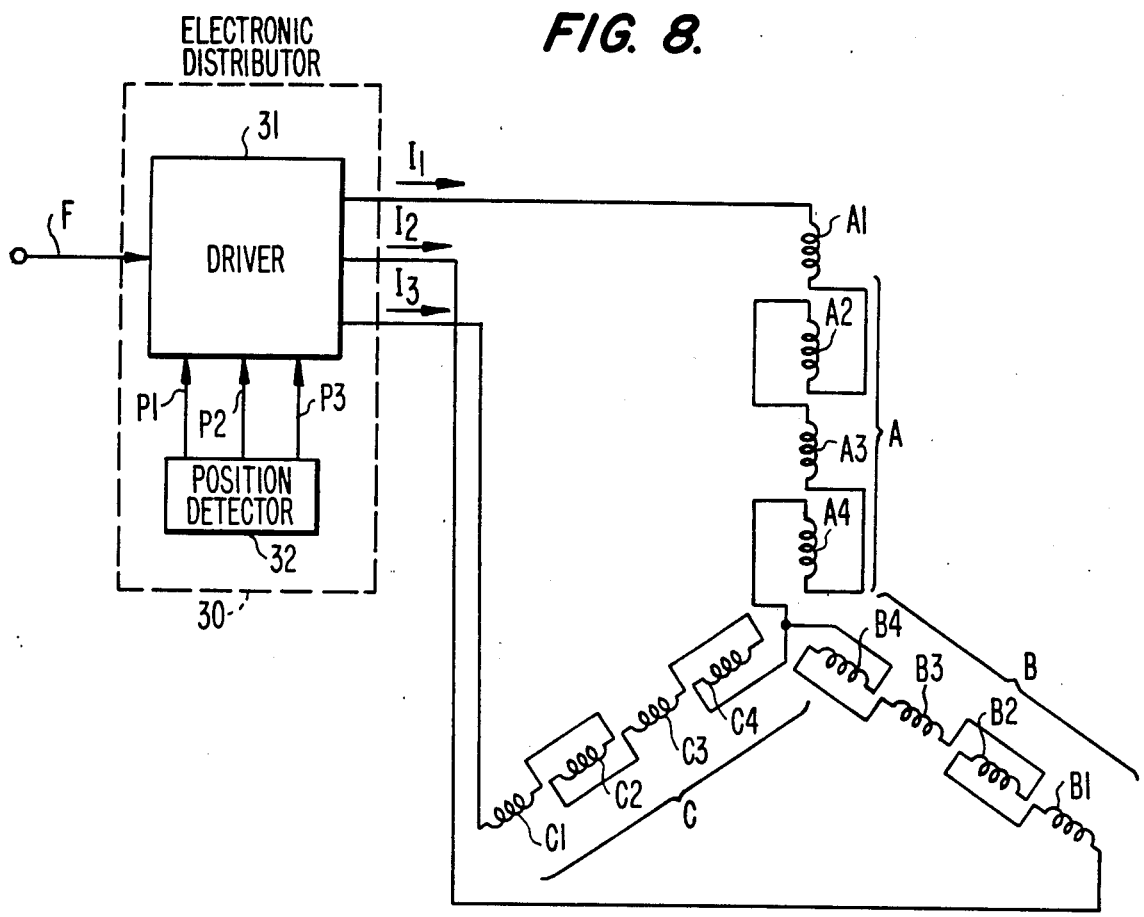
FIG. 8 shows an electronic distributor for the rotating electric motor shown in FIG. 5.
Figure 9:
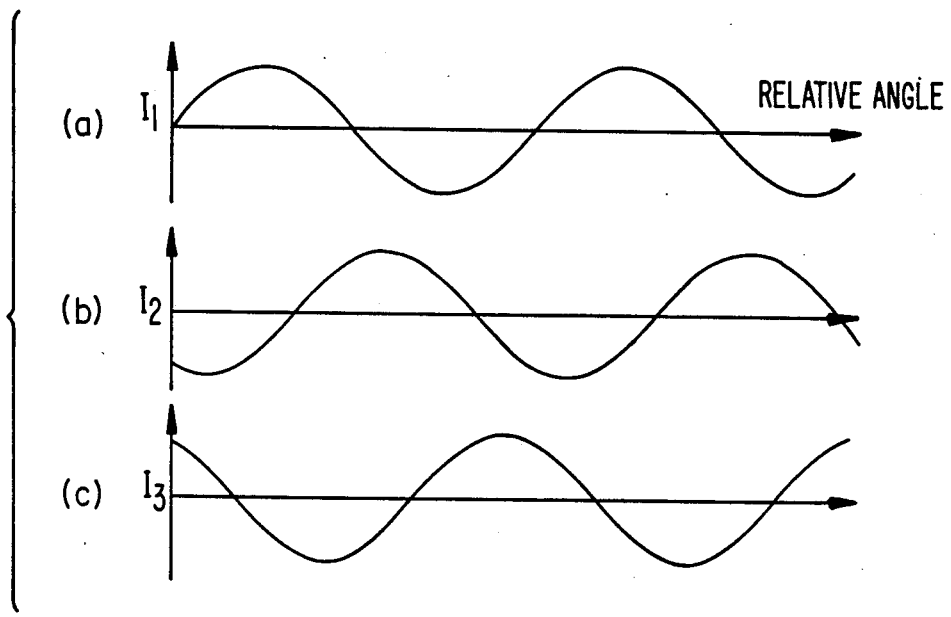
FIG. 9 shows waveforms of three phase currents I1,I2 and I3 supplied to the three phase winding groups of the rotating electric motor shown in FIG. 5.

FIG. 8 shows an electronic distributor 30 for the brushless DC motor of the invention. The electronic distributor 30 has a driver 31 and a position detector 32, and it supplies the star-connected three phase winding groups A,B and C with three phase currents I1,I2 and I3, respectively. The position detector 32 detects the relative position between the armature core 24 and the permanent magnet 23, and it outputs three phase sinusoidal signals P1,P2 and P3 which change with the rotation of the rotor 22 by detecting the magnetic flux of the permanent magnet 23. The driver 31 outputs the three phase currents I1,I2 and I3, which are proportional to a command signal F multiplied by the output signals P1,P2 and P3, respectively. Thus, a torque to accelerate the rotor 22 is generated by the interaction between the magnetic flux of the permanent magnet 23 and the three phase currents I1,I2 and I3 to the winding groups A,B and C. A detailed explanation of the electro-magnetic torque by the three phase currents is described after.

In FIG. 7, since the winding slots a to x are positioned by unequal angles, the effective pitches of the teeth are not the same, where the effective pitch of a tooth is defined as the angle between the centers of entrance parts of the winding slots forming the tooth. In the case of $T=6P=24$ ($P=4$), the standard effective pitch is $D=(360/T)=15$ degree when all of the winding slots are positioned apart by equal angles. So, a tooth having the effective pitch equal to D is called a standard-tooth, a tooth having an effective pitch smaller than D is called a short-tooth, and a tooth having an effective pitch larger than D is called a long-tooth in the specification. A tooth is designated by the winding slots forming the tooth. For example, the tooth a-b means the tooth formed by the winding slots a and b. In FIG. 7, the teeth a-b, c-d, d-e, f-g, g-h, i-j, j-k, k-l, l-m, m-n, o-p, p-q, r-s, s-t, u-v, v-w, w-x and x-a are standard-teeth, the teeth b-c, e-f and h-i are long-teeth, and the teeth n-o, q-r and t-u are short-teeth. In FIG. 7 and other figures, the standard-tooth, the long-tooth and the short-tooth are designated by E,R and Z, respectively.

A block, having at least one short-tooth, and at least one standard-tooth and no long-teeth positioned sequentially, is called a short-block, and a block, having at least one long-tooth, and at least one standard-tooth and no short-teeth positioned sequentially, is called a long-block in the specification. A block is designated by the winding slots positioned at the sides of the block. For example, the block $<a,m>$ means the block of the teeth a-b,b-c,c-d,d-e,e-f,f-g,g-h,h-i,i-j,j-k,k-l and l-m. In FIG. 7, the armature core 24 has only one long-block $<a,m>$ and short-block $<m,a>$ alternatively positioned around the rotary axis 21. The long-block $<a,m>$ has 3 long-teeth of b-c,e-f and h-i and 9 standard-teeth of a-b,c-d,d-e,f-g,g-h,i-j,j-k,k-l and l-m. The short-block $<m,a>$ has 3 short-teeth of n-o,q-r and t-u and 9 standard-teeth of m-n,o-p,p-q,r-s,s-t,u-v,v-w,w-x and x-a. Notice that the number of teeth is not used to clasify the block but the nature of the teeth. Notice also that the standard-teeth positioned between neighboring long-teeth and short-teeth can belong to either a long-block or a short-block, for that is not important in order to distinguish the existence of a long-block or a short-block. In the embodiment of FIG. 7, the number of the teeth in the long-block $<a,m>$ is so selected as to be equal to that in the short-block $<m,a>$.

Each of the effective pitches of the long-teeth b-c,e-f and h-i is equal or nearly equal to $D(1+1/P)=18.75$ degrees, and each of the effective pitches of the short-teeth n-o,q-r and t-u is equal or nearly equal to $D(1-1/P)=11.25$ degrees. Thus, the whole effective pitch of the long-block $<a,m>$ is 191.25 degrees, and the whole effective pitch of the short-block $<m,a>$ is 168.75 degrees.

Next, the cogging torque of the embodiment of the present invention shown in FIG. 5 is explained hereinbelow. Cogging torque is generated by the interaction between the permanent magnet and the armature core, more particularly by changing the magnetic energy stored in the air gap corresponding to the relative rotation between the permanent magnet and the armature core, and it changes periodically according to the relative position thereof with a basic period of 360 degrees (one revolution). This is harmful for getting a smooth rotation of the rotating electric motor. The cogging torque is influenced by the shape of the armature core facing the permanent magnet and by the distribution of the magnetic charge in the poles of the permanent magnet. The shape of the armature core is represented by shape harmonics expanded by the Fourier series with a basic period of 360 degrees, and the shape harmonics relate to the shape of the armature core. The distribution of the magnetic charge is represented by the magnetic distribution harmonics also expanded by the Fourier series with the basic period of 360 degrees, and the magnetic distribution harmonics relate to the distribution of the magnetic charge in the permanent magnet.

In the case of using a permanent magnet which provides the armature core with a fixed field flux distribution, the cogging torque is determined by the convolution between the shape harmonics and the magnetic distribution harmonics, and is also expanded by the Fourier series with the basic period of 360 degrees. The magnitude of each component (cycle/revolution) of the cogging torque is proportional to the product of the component of the shape harmonics and the component of the magnetic distribution harmonics of the same degree as that of the cogging torque.

Since the magnetic energy in the air gap is proportional to the square of the magnetic flux density of the permanent magnet and the distribution of the magnetic flux density shown in FIG. 6 is symmetrical with the polarities, the magnetic distribution harmonics of the permanent magnet 23 is a periodic function with a period of 1 pole pitch $(360/P)=90$ degrees. Thus, the cogging torque becomes small when the composite magnetic variation of the shape harmonics of the armature core 24 with a period of 1 pole pitch becomes small.

Figure 10:
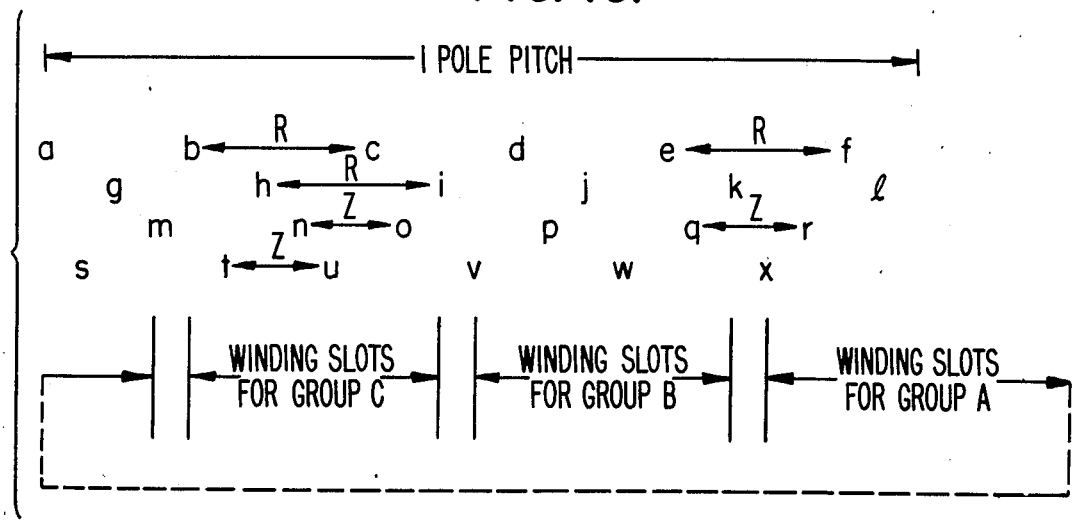
FIG. 10 shows phases of the winding slots of the armature core with a period of 1 pole pitch of the permanent magnet about the rotating electric motor of the present invention shown in FIG. 5 and FIG. 7.

FIG. 10 shows phases of the winding slots a to x of the armature core 24 with a period of 1 pole pitch of the permanent magnet 23. The winding slots a,f,g,l,m,r,s and x, where the winding coils A1,A2,A3 and A4 of the winding group A are wound, are positioned at a phase difference of (1 pole pitch)/24. That is, the phases of the winding slots a,f,g,l,m,r,s and x differ from each other by (1 pole pitch)/24, and the range of the phases of the winding slots a,f,g,l,m,r,s and x is within (1 pole pitch)/3. Similarly, the winding slots d,e,j,k,p,q,v and w, where the winding coils B1,B2,B3 and B4 of the winding group B are wound, are positioned by the same phase difference of (1 pole pitch)/24, and the range of the phases of the winding slots d,e,j,k,p,q,v and w is within (1 pole pitch)/3. Similarly, the winding slots b,c,h,i,n,o,t and u, where the winding coils C1,C2,C3 and C4 of the winding group C are wound, are positioned by the same phase difference of (1 pole pitch)/24, and the range of the phases of the winding slots b,c,h,i,n,o,t and u is within (1 pole pitch)/3. Furthermore, the phase differences among the winding slot group (a,f,g,l,m,r,s,x) for the winding group A, the winding slot group (d,e,j,k,p,q,v,w) for the winding group B and the winding slot group (b,c,h,i,n,o,t,u) for the winding group C are exactly equal to (1 pole pitch)/3. As the result of this, the phase differences among the three phase winding group A,B and C are exactly equal to 120el degrees.

Figure 11:
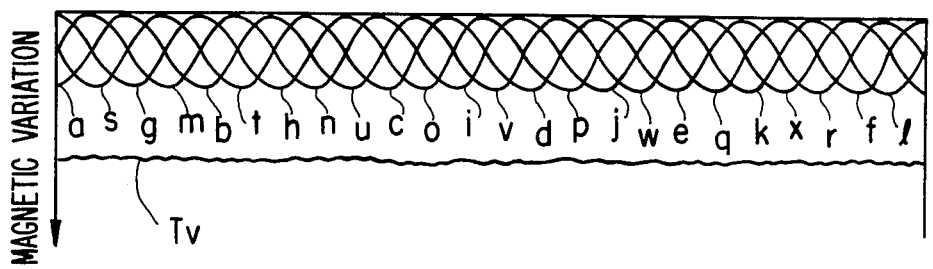
FIG. 11 shows a composite magnetic variation of the rotating electric motor of the present invention shown in FIG. 5 and FIG. 7.

All of the phase of the winding slots a to x are different by the phase difference of (1 pole pitch)/24, and it is expected that the composite magnetic variation with the period of 1 pole pitch becomes small. FIG. 11 shows waveforms of the magnetic variations of the winding slots a to x and a waveform of the composite magnetic variation Tv of the armature core 24. The magnetic variation of each of the winding slots changes smoothly corresponding to the each opening width. Since the phases of the winding slots differ by (1 pole pitch)/24, the composite magnetic variation Tv becomes very small.

Figure 12:
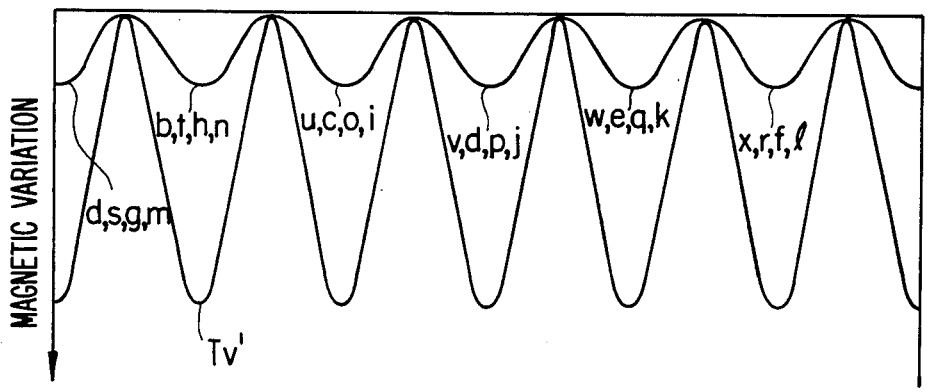
FIG. 12 shows a composite magnetic variation of the conventional rotating electric motor shown in FIG. 1 and FIG. 2.

FIG. 12 shows a waveform of the composite magnetic variation Tv' of the armature core 4 of the conventional rotating electric motor shown in FIG. 1 and FIG. 2. In the case of the conventional rotating electric motor, the phases of the winding slots a,g,m, and s are same with a period of 1 pole pitch, the phases of the winding slots b,h,n and t are same, the phases of the winding slots c,i,o and u are same, the phases of the winding slots d,j,p and v are same, the phases of the winding slots e,k,q and w are same, and the phases of the winding slots f,l,r and x are same. So, the composite magnetic variation Tv' is large. Comparing the composite magnetic variation Tv of FIG. 11 with the composite magnetic variation Tv' of FIG. 12, the Tv of the motor of the present invention is much smaller than the Tv' of the conventional motor. Therefore, the embodiment of the brushless DC motor of the invention shown in FIG. 5 has a lower cogging torque.

Next, the electro-magnetic torque of the brushless DC motor of the present invention shown in FIG. 5, FIG. 6, FIG. 7, FIG. 8 and FIG. 9 is explained hereinbelow. The electro-magnetic torque is the sum of the torques generated by the three phase currents I1,I2 and I3 of the three phase winding groups A,B and C, and each of the torques generated by the three phase winding groups A,B and C due to each of the currents I1,I2 and I3 is the product of the current and the flux density. Thus, the electro-magnetic torque Tor is $$Tor = Gx(Ba I1 + Bb I2 + Bc I3) \quad (1)$$

where Gx is a constant value, and Ba,Bb and Bc are the equivalent flux densities of the three phase winding groups A,B and C, respectively. It is assumed here that the distribution of the permanent magnet 23 is sinusoidal, that is $$B(x) = B1 \sin(x) \quad (2)$$

where x is an angle (electrical degrees). Then, the equivalent flux densities Ba,Bb and Bc also becomes sinusoidal, that is $$Ba(z) = KB1 \sin(z) \quad (3a)$$

$$Bb(z) = KB1 \sin(z - 120el) \quad (3b)$$

$$Bc(z) = KB1 \sin(z - 240el) \quad (3c)$$

where K is a constant value and z is the relative angle (electrical degrees) between a reference point of the armature core 24 and a reference point of the permanent magnet 23. Since the three phase currents I1,I2 and I3 are sinusoidal, $$I1(z) = Ip \sin(z) \quad (4a)$$

$$I2(z) = Ip \sin(z - 120el) \quad (4b)$$

$$I3(z) = Ip \sin(z - 240el) \quad (4c)$$

where Ip is the peak value of the currents proportional to the command signal F. Then, the generated torque becomes $$Tor 32 \ (3/2)(G \times K)B1 Ip \quad (5)$$

The electro-magnetic torque Tor of the embodiment is smooth and has no ripple torque.

But the actual distribution of the permanent magnet 23 of FIG. 6 has higher components of 3rd, 5th, and 7th, and so on. These higher components, especially the 3rd, 5th and 7th, make a ripple torque, and the ripple torque prevents a smooth rotation of the motor as well as the cogging torque. Since the phases of the winding slots for each winding group A,B or C are different within (1 pole pitch)/3, the equivalent effective flux densities Ba,Bb and Bc have reduced components of 3rd, 5th, and 7th, and so on. Assuming that the distribution of the flux density of the permanent magnet 23 is $$B(x) = B1 \sin(x) + B3 \sin(3x) + B5 \sin(5x) + B7 \sin(7x) \quad (6)$$

Then, the equivalent flux densities Ba, Bb and Bc become $$Ba(z) = K\{K1B1 \sin(z) + K3B3 \sin(3z) + K5B5 \sin(5z) + K7B7 \sin(7z)\} \quad (7a)$$

$$Bb(z) = Ba(z - 120el) \quad (7b)$$

$$Bc(z) = Ba(z - 240el) \quad (7c)$$

where K1=0.956, K3=0.641, K5=0.194 and K7=0.141. Thus, K1/K1=1 (normalized), K3/K1=0.67, K5/K1=0.20 and K7/K1=−0.15. Since the absolute values of the coefficients K3/K1,K5/K1 and K7/K1 are much smaller than 1, the influences of the higher components B3, B5, B7 of the permanent magnet 23 are reduced and the ripple torque of the brushless DC motor of the above embodiment becomes small. Therefore, the cogging torque and the ripple torque of the brushless DC motor of the present invention shown in FIG. 5 to FIG. 9 are small, and a smooth rotation can be obtained.

The winding coils A1, A2, A3, A4, B1, B2, B3, B4, C1, C2, C3 and C4 of the armature core 24 in the above embodiment can be automatically wound by a winding machine, because the winding pitches of these winding coils are almost equal to 5/6 of the 1 pole pitch of the permanent magnet 23, where the winding pitch of a winding coil is the angle between the centers of the winding slots in which the winding coil is wound. The winding pitches of these winding coils A1 to C4 are between 135el and 165el. Exactly speaking, the winding pitches of the winding coils A1, A2, A3, A4, B1, B2, B3, B4, C1, C2, C3 and C4 are 165el, 157.5el, 135el, 142.5el, 165el, 142.5el, 135el, 157.5el, 150el, 142.5el, 150el and 157.5el, respectively.

In the case of the above embodiment, an electronic distributor supplying polyphase winding groups with polyphase sinusoidal currents is used, but the construction of the distributor does not relate to the cogging torque (the distributor relates only to ripple torque). So, a mechanical brush commutator can be replaced by the electronic distributor shown in FIG. 8. Besides, although the permanent magnet 23 of FIG. 5 or of the other figures is formed in a continuous circular form, a magnet formed of separate parts with gaps therebetween can also be used in the present invention.

As mentioned before, the cogging torque of the rotating electric motor of the invention is small. Generally speaking, cogging torque can be reduced by providing a rotating electric motor which comprises a field permanent magnet member of a circular form and an armature core made of a magnetic material, said magnet member having permanently magnetized N and S poles alternately positioned around the rotary axis of said rotary electric motor, the number of said N and S poles is P which is an even number, said armature core having a plurality of teeth made between two adjacent winding slots where a plurality of overlapping winding coils of polyphase winding groups are wound, the number of said teeth is T which is not less than 2P, and the number of the phases of said polyphase winding groups is H which is not less than 2, wherein said armature core has at least one short-block and one long-block alternately positioned around said rotary axis, each of said short-blocks has at least one short-tooth, and at least one standard-tooth and no long-teeth, and each of said long-blocks has at least one long-tooth, and at least one standard-tooth and no short-teeth, where the effective pitch of said standard-teeth is equal to $D=(360/T)$ degrees, each of the effective pitches of said short-teeth is smaller than D, and each of the effective pitches of said long-teeth is larger than D.

It is preferable that the whole effective pitch of 1 pair of adjacent said short-blocks and long-blocks is equal or almost equal to $(360/P)Q$ degrees, where Q is an integer not less than 2, each of the effective pitches of said short-teeth in said 1 pair of adjacent said short-blocks and long-blocks is equal or almost equal to $D(1-J/Q)$ degrees, and each of the effective pitches of said long-teeth in said 1 pair of adjacent short-blocks and long-blocks is equal or almost equal to $D(1+G/Q)$ degrees, where J and G are integers not less than 1 and not larger than Q/2 and preferably $J=G=1$. It is also preferable that the number of said short-teeth in said short-block is not less than 2, and the number of said long-teeth in said long-block is not less than 2. It is also preferable that the number of said short-teeth in said short-block is equal to the number of said long-teeth in said long-block, which is less than Q and preferably equal to $Q-1$. It is also preferable that each of said long-teeth is adjacent to two of said standard-teeth at either sides thereof, and each of said short-teeth is adjacent to two of said standard-teeth at the either side thereof.

Figure 13:
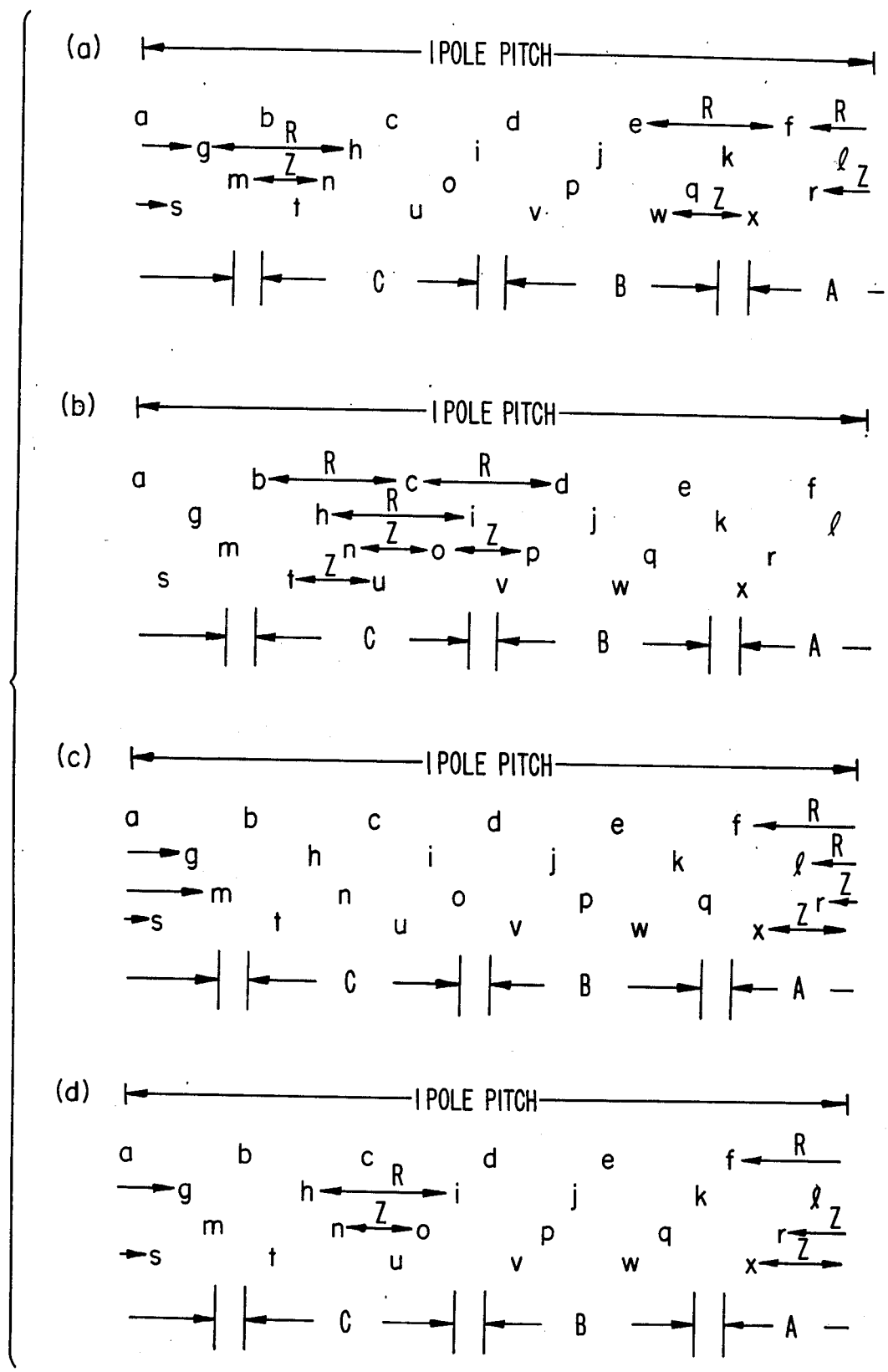
FIGS. 13(a) to (d) show other arrangements of the winding slots of the armature core shown in FIG. 5 according to the present invention.

Other constructions of the rotating electric motor of the present invention having reduced cogging torque are shown in FIG. 13(a) to FIG. 13(d). FIG. 13(a) shows another arrangement of the winding slots a to x of the armature core 24 shown in FIG. 5 and FIG. 7. The positions of the long-teeth, the short-teeth and the standard-teeth are different from the armature core 24 of FIG. 7. That is, the teeth e-f,f-g and g-h are long-teeth, the teeth m-n,r-s and w-x are short-teeth and other teeth are standard-teeth. The armature core has only one long-block and short-block, for example, the long-blok $<a,m>$ and the short-block $<m,a>$. The effective pitch of the long-teeth is equal to $D(1+1/P)=18.75$ degrees, and the effective pitch of the short-teeth is equal to $D(1-1/P)=11.25$ degrees. So, $Q=P=4$, $G=1$ and $J=1$.

FIG. 13(b) shows another arrangement of the winding slots a to x of the armature core 24 shown in FIG. 5 and FIG. 7. The positions of the long-teeth, the short-teeth and the standard-teeth are different from the armature code 24 of FIG. 7. That is, the teeth b-c,c-d and h-i are long-teeth, the teeth n-o,o-p and t-u are short-teeth and other teeth are standard-teeth. The armature core has only one long-block and short-block, for example, the long-block $<a,m>$ and the short-block $<m,a>$. The effective pitch of the long-teeth is equal to $D(1+1/P)=18.75$ degrees, and the effective pitch of the short-teeth is equal to $D(1-1/P)=11.25$ degrees. So, $Q=P=4$, $G=1$ and $J=1$.

FIG. 13(c) shows still another arrangement of the winding slots a to x of the armature core 24 shown in FIG. 5 and FIG. 7. The positions of the long-teeth, the short-teeth and the standard-teeth are different from the armature core 24 of FIG. 7. That is, the teeth f-g and l-m are long-teeth, the teeth r-s and x-a are short-teeth and other teeth are standard-teeth. The armature core has only one long-block and short-block, for example, the long-block $<a,m>$ and the short-block $<m,a>$. The effective pitch of the long-tooth f-g is equal to $D(1+2/P)=22.5$ degrees, the effective pitch of the long-tooth l-m is equal to $D(1+1/P)=18.75$ degrees, the effective pitch of the short-tooth r-s is equal to $D(1-2/P)=7.5$ degrees, and the effective pitch of the short-tooth x-a is equal to $D(1-1/P)=11.25$ degrees. So, $Q=P=4$, $G=1$ or 2, and $J=1$ or 2.

FIG. 13(d) shows another arrangement of the winding slots a to x of the armature core 24 shown in FIG. 5 and FIG. 7. The positions of the long-teeth, the short-teeth and the standard teeth are different from the armature core 24 of FIG. 7. That is, the teeth f-g and h-i are long-teeth, the teeth n-o,r-s and x-a are short-teeth and other teeth are standard-teeth. The armature core has only one long-block and short-block, for example, the long-block $<a,m>$ and the short-block $<m,a>$. The effective pitch of the long-tooth f-g is equal to $D(1+2/P)=22.5$ degrees, the effective pitch of the long-tooth h-i is equal to $D(1+1/P)=18.75$ degrees, and the effective pitch of the short-teeth n-o,r-s and x-a is equal to $D(1-1/P)=11.25$ degrees. So, $Q=P=4$, $G=1$ or 2, and $J=1$.

As shown in FIG. 13(d), the number of long-teeth is not to be equal to the number of short-teeth. Generally speaking, cogging torque can be reduced by providing a rotating electric motor which comprises a field permanent magnet member of a circular form and an armature core made of a magnetic material, said magnet member having permanently magnetized N and S poles alternately positioned around the rotary axis of said rotary electric motor, the number of said N and S poles is P which is an even number, said armature core having a plurality of teeth arranged between two adjacent winding slots where a plurality of overlapping winding coils of polyphase winding groups are wound, the number of said teeth is T which is not less than 2P, and the number of the phases of said polyphase winding groups is H which is not less than 2, wherein said winding slots are positioned at unequal angles so that the number of the phases of said winding slots with a period of 1 pole pitch of said magnet member is larger than 2H.

It is preferable that all of the phases of the winding slots with a period of 1 pole pitch of said magnet member are different from each other preferably by an equal angle of (1 pole pitch)/T.

EMBODIMENTS OF THE INVENTION WITH THE RELATIONSHIP T=3P

Figure 3:
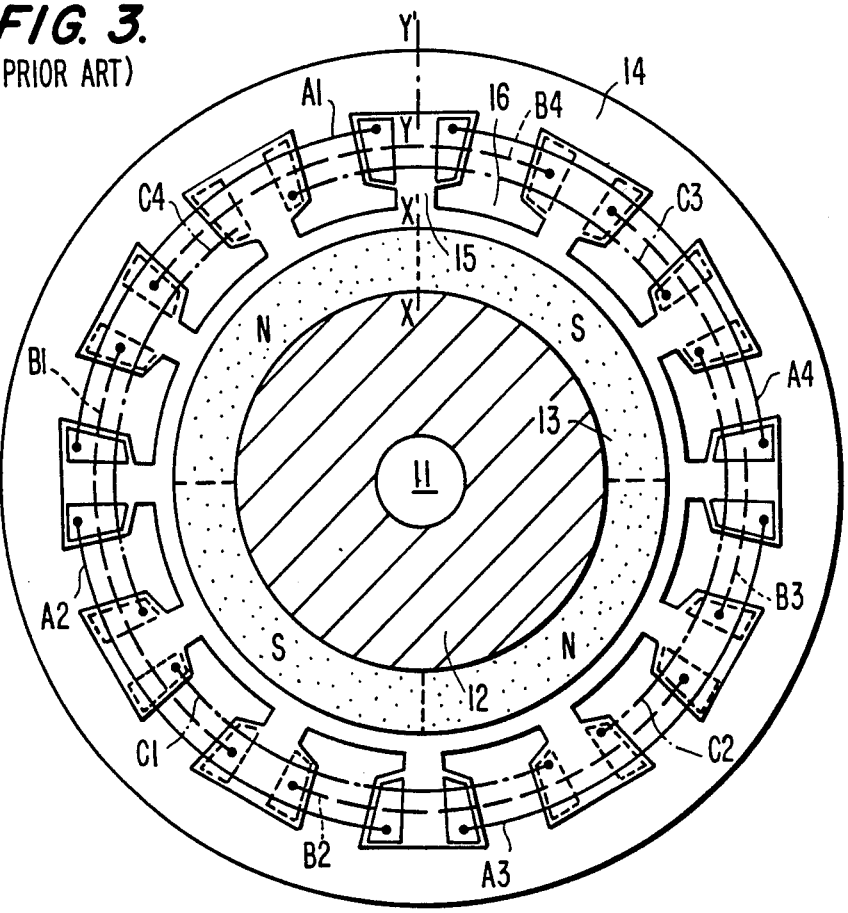
FIG. 3 is a schematic sectional view of another conventional rotating electric motor with the relationship T=3P.
Figure 4:
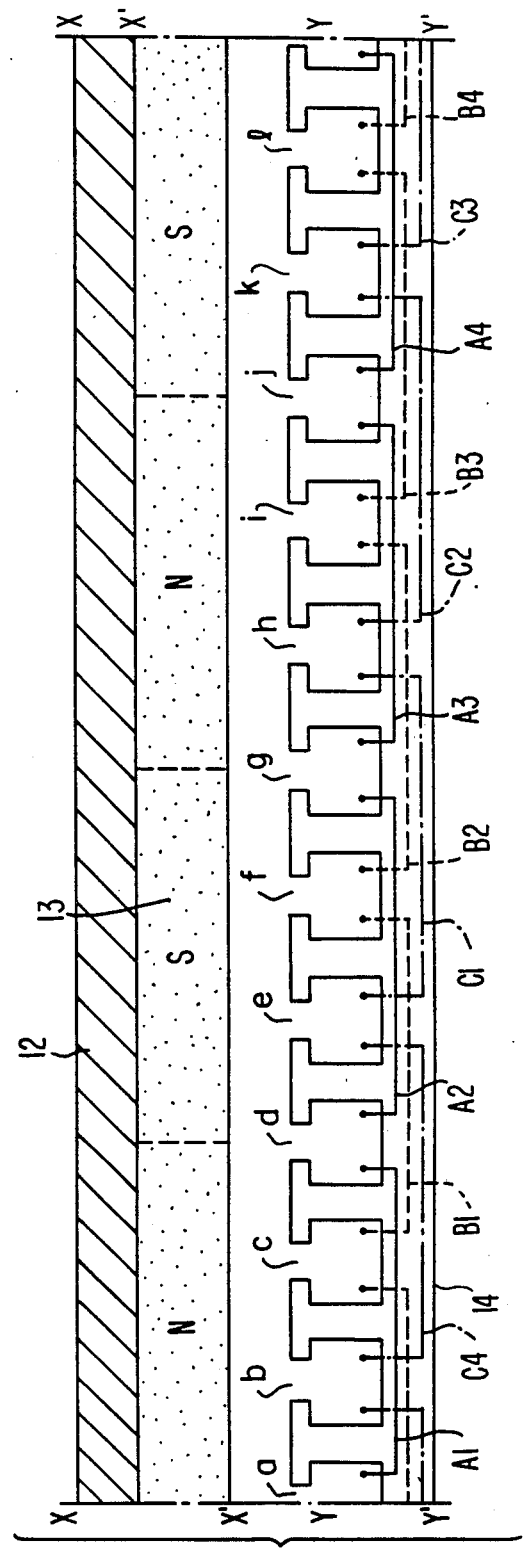
FIG. 4 shows a development view of the conventional rotating electric motor of FIG. 3 developed at the lines X—X' and Y—Y'.
Figure 14:
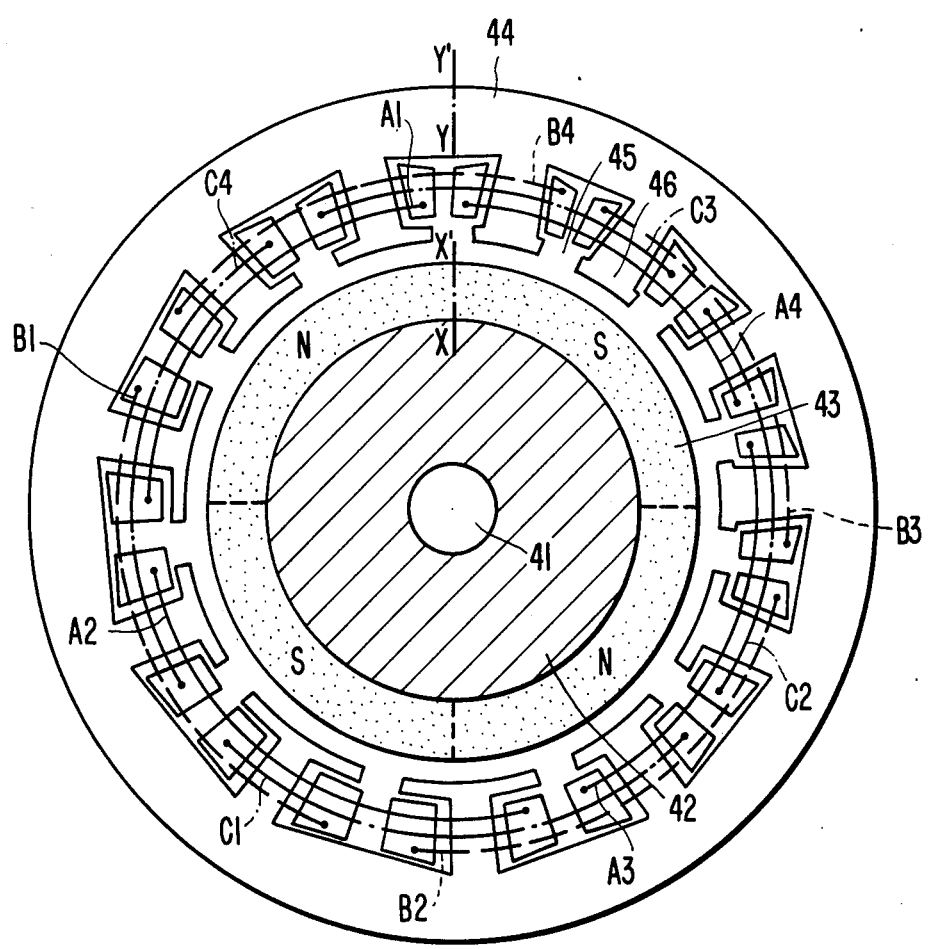
FIG. 14 is a schematic sectional view of further still another embodiment of the rotating electric motor of the present invention with the relationship T=3P.
Figure 15:
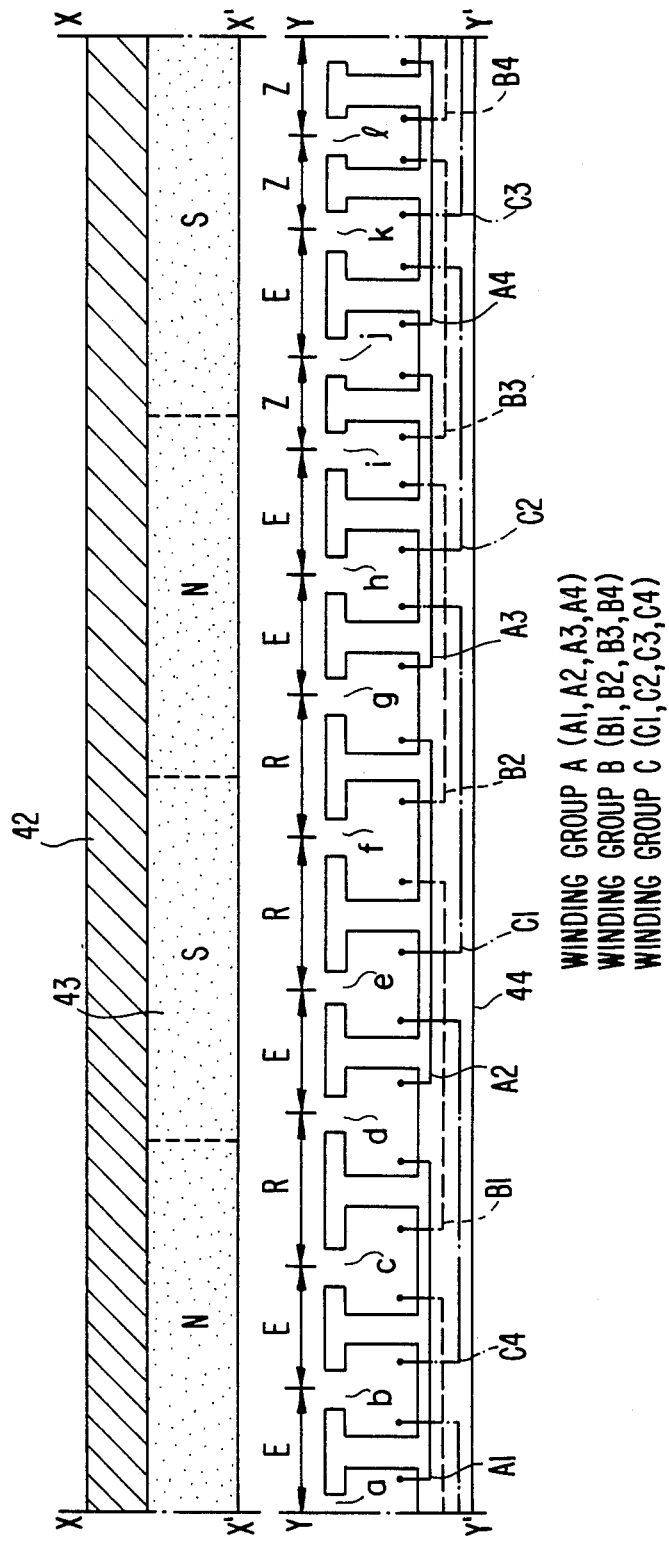
FIG. 15 shows a development view of the rotating electric motor of the present invention of FIG. 14 developed at the lines X—X' and Y—Y'.

FIG. 14 and FIG. 15 show another brushless DC motor of the present invention with the relationship T=3P, which corresponds to the conventional rotating electric motor shown in FIG. 3 and FIG. 4. FIG. 14 is a schematic sectional view of the brushless DC motor of the present invention. In FIG. 14, a cylindrical permanent magnet 43 is fixed to the outer circumference of a rotor 42 made of a magnetic material, and the permanent magnet 43 rotates with the rotor 42 around a rotary axis 41. The permanent magnet 43 has 4 poles of alternating N and S poles positioned apart by equal angles of 90 degrees, that is, P=4. The distribution of the magnetic flux density of the permanent magnet 43 is the same as that shown in FIG. 6. The teeth 46 of an armature core 44, each of which is formed between two adjacent winding slots 45, are faced to the poles of the permanent magnet 43. The rotary axis 41 of the rotor 42 is rotatably supported by the armature core 44. Therefore, the relative position between the teeth 46 of the armature core 44 and the poles of the permanent magnet 43 changes according to the rotation of the rotor 42.

FIG. 15 shows a development view of the brushless DC motor of the invention of FIG. 14 developed at the lines X—X' and Y—Y', when these lines are in a line. The armature core 44 has 12 of the winding slots a, b, c, d, e, f, g, h, i, j, k and l, and 12 of the teeth is provided between two adjacent winding slots, that is, T=12. Overlapping winding coils A1, A2, A3, A4, B1, B2, B3, B4, C1, C2, C3 and C4 are wound in the winding slots a to l. Each of the winding coils A1 to C4 encircles 3 of the teeth of the armature core 44. That is, A1 is wound in the winding slots a and d, A2 is wound in the winding slots d and g, A3 is wound in the winding slots g and j, A4 is wound in the winding slots j and a, B1 is wound in the winding slots c and f, B2 is wound in the winding slots f and i, B3 is wound in the winding slots i and l, B4 is wound in the winding slots l and c, C1 is wound in the winding slots e and h, C2 is wound in the winding slots h and k, C3 is wound in the winding slots k and b, and C4 is wound in the winding slots b and e. The winding coils A1,A2,A3 and A4 are connected serially to form a winding group A of the first phase, the winding coils B1,B2,B3 and B4 are connected serially to form a winding group B of the second phase, and the winding coils C1,C2,C3 and C4 are connected serially to form a winding group C of the third phase. As described after, the phase differences among the winding groups A,B and C are exactly equal to 120el degrees (electrical degrees), where 180el is equivalent to 1 pole pitch (360/P) degrees. In FIG. 14, if P=4, then 180el is equivalent to 90 degrees (mechanical degrees), which is the same as that of the conventional motor of FIG. 3. Therefore, a torque accelerating the rotor 42 is obtained by supplying three phase currents to the three phase winding groups A, B and C. The electronic distributor 30 shown in FIG. 8 is also usable for the brushless DC motor of the present invention of FIG. 14.

In FIG. 15, since the winding slots a to l are positioned apart by unequal angles, the effective pitches of the teeth are not the same. In the case of T=3P=12 (P=4), the standard effective pitch is D=(360/T)=30 degrees when all of the winding slots are positioned apart by equal angles. So, a standard-tooth has an effective pitch equal to D, a short-tooth has an effective pitch smaller than D, and a long-tooth has an effective pitch larger than D. In FIG. 15, the teeth a-b, b-c, d-e, g-h, h-i and j-k are standard-teeth, the teeth c-d, e-f and f-g are long-teeth, and the teeth i-j, k-l and l-a are short-teeth. The armature core 44 has only one long-block <a,g> and one short-block <g,a> alternatively positioned around the rotary axis 41. The long-block <a,g> has 3 long-teeth of c-d,e-f and f-g and 3 standard-teeth of a-b,b-c and d-e. The short-block <g,a> has 3 short-teeth of i-j,k-l and l-a and 3 standard-teeth of g-h,h-i and j-k.

Each of the effective pitches of the long-teeth c-d,e-f and f-g is equal or nearly equal to $D(1+1/P)=37.5$ degrees, and each of the effective pitches of the short-teeth i-j,k-l and l-a is equal or nearly equal to $D(1-1/P)=22.5$ degrees. Thus, the whole effective pitch of the long-block <a,g> is 202.5 degrees, and the whole effective pitch of the short-block <g,a> is 157.5 degrees.

Figure 16:
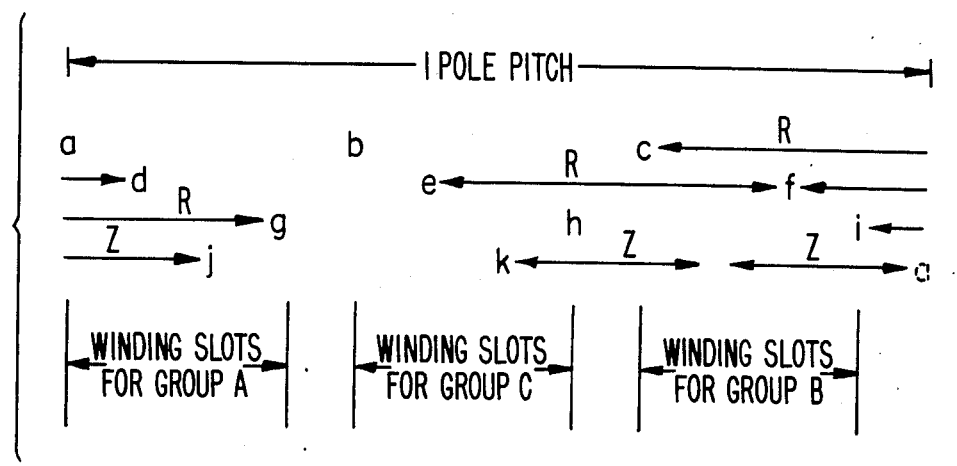
FIG. 16 shows phases of the winding slots of the armature core with a period of 1 pole pitch of the permanent magnet about the rotating electric motor of the present invention shown in FIG. 14 and FIG. 15.

Next, the cogging torque of the embodiment of the present invention shown in FIG. 14 is explained hereinbelow. FIG. 16 shows phases of the winding slots a to l of the armature core 44 with a period of 1 pole pitch of the permanent magnet 43. The winding slots a,d,g and j, where the winding coils A1,A2,A3 and A4 of the winding group A are wound, are positioned at a phase difference of (1 pole pitch)/12. That is, the phases of the winding slots a,d,g and j differ from each other by (1 pole pitch)/12, and the range of the phases of the winding slots a,d,g and j is within (1 pole pitch)/3. Similarly, the winding slots c,f,i and l, where the winding coils B1,B2,B3 and B4 of the winding group B are wound, are positioned apart by the same phase difference of (1 pole pitch)/12, and the range of the phases of the winding slots c,f,i and l is within (1 pole pitch)/3. Similarly, the winding slots b,e,h and k, where the winding coils C1,C2,C3 and C4 of the winding group C are wound, are positioned apart by the same phase difference of (1 pole pitch)/12, and the range of the phases of the winding slots b,e,h and k is within (1 pole pitch)/3. Further, the phase differences among the winding slot group (a,d,g,j) for the winding group A, the winding slot group (c,f,i,l) for the winding group B and the winding slot group (b,e,h,k) for the winding group C are exactly equal to (1 pole pitch)/3. As the result of this, the phase differences among the three phase winding group A,B and C are exactly equal to 120el degrees, and a smooth torque is obtained by using the distributor 30 of FIG. 8.

Figure 17:
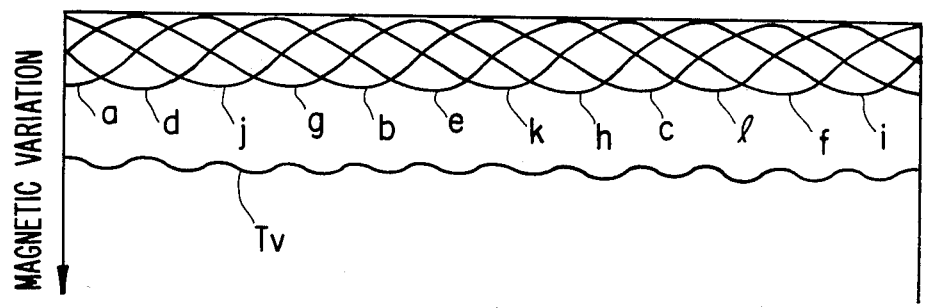
FIG. 17 shows a composite magnetic variation of the rotating electric motor of the present invention shown in FIG. 14 and FIG. 15.

All of the phases of the winding slots a to l are different by the phase difference of (1 pole pitch)/12, and it is expected that the composite magnetic variation with a period of 1 pole pitch becomes small. FIG. 17 shows waveforms of the magnetic variations of the winding slots a to l and a waveform of the composite magnetic variation Tv of the armature core 44. The magnetic variation of each of the winding slots changes smoothly corresponding to each opening width. Since the phases of the winding slots differ by (1 pole pitch)/12, the composite magnetic variation Tv becomes very small.

Figure 18:
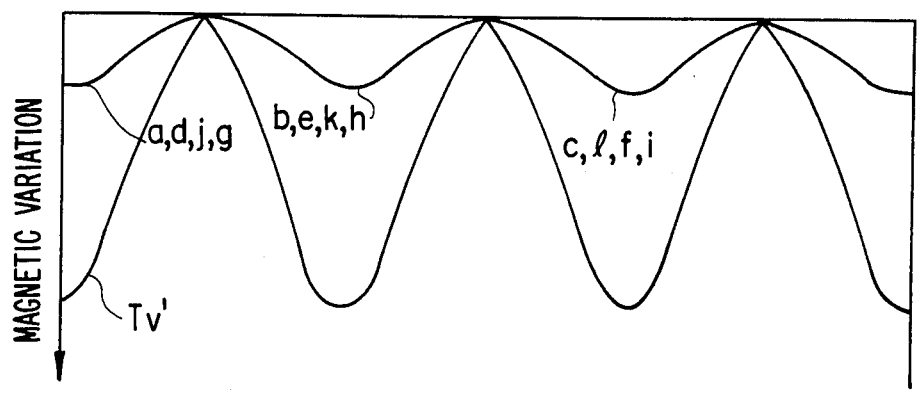
FIG. 18 shows a composite magnetic variation of the conventional rotating electric motor shown in FIG. 3 and FIG. 4.

FIG. 18 shows a waveform of the composite magnetic variation Tv' of the armature core 14 of the conventional rotating electric motor shown in FIG. 3 and FIG. 4. In the case of the conventional rotating electric motor, the phases of the winding slots a,d,g and j are same with the period of the 1 pole pitch, the phases of the winding slots b,e,h and k are same, and the phases of the winding slots c,f,i and l are same. So, the composite magnetic variation Tv' is large. Comparing the composite magnetic variation Tv of FIG. 17 with the composite magnetic variation Tv' of FIG. 18, the Tv of the present motor of the invention is much smaller than the Tv' of the conventional motor. Therefore, the embodiment of the brushless DC motor of the present invention shown in FIG. 14 has a lower cogging torque.

The winding coils A1, A2, A3, A4, B1, B2, B3, B4, C1, C2, C3 and C4 of the armature core 44 in the above embodiment can be automatically wound by a winding machine, because the winding pitches of these winding coils are almost equal to 1 pole pitch of the permanent magnet 43. The winding pitches of these winding coils A1 to C4 are between 150el and 210el. Exactly speaking, the winding pitches of the winding coils A1, A2, A3, A4, B1, B2, B3, B4, C1, C2, C3 and C4 are 195el, 210el, 165el, 150el, 210el, 195el, 150el, 165el, 210el, 165el, 150el and 195el, respectively.

Figure 19:
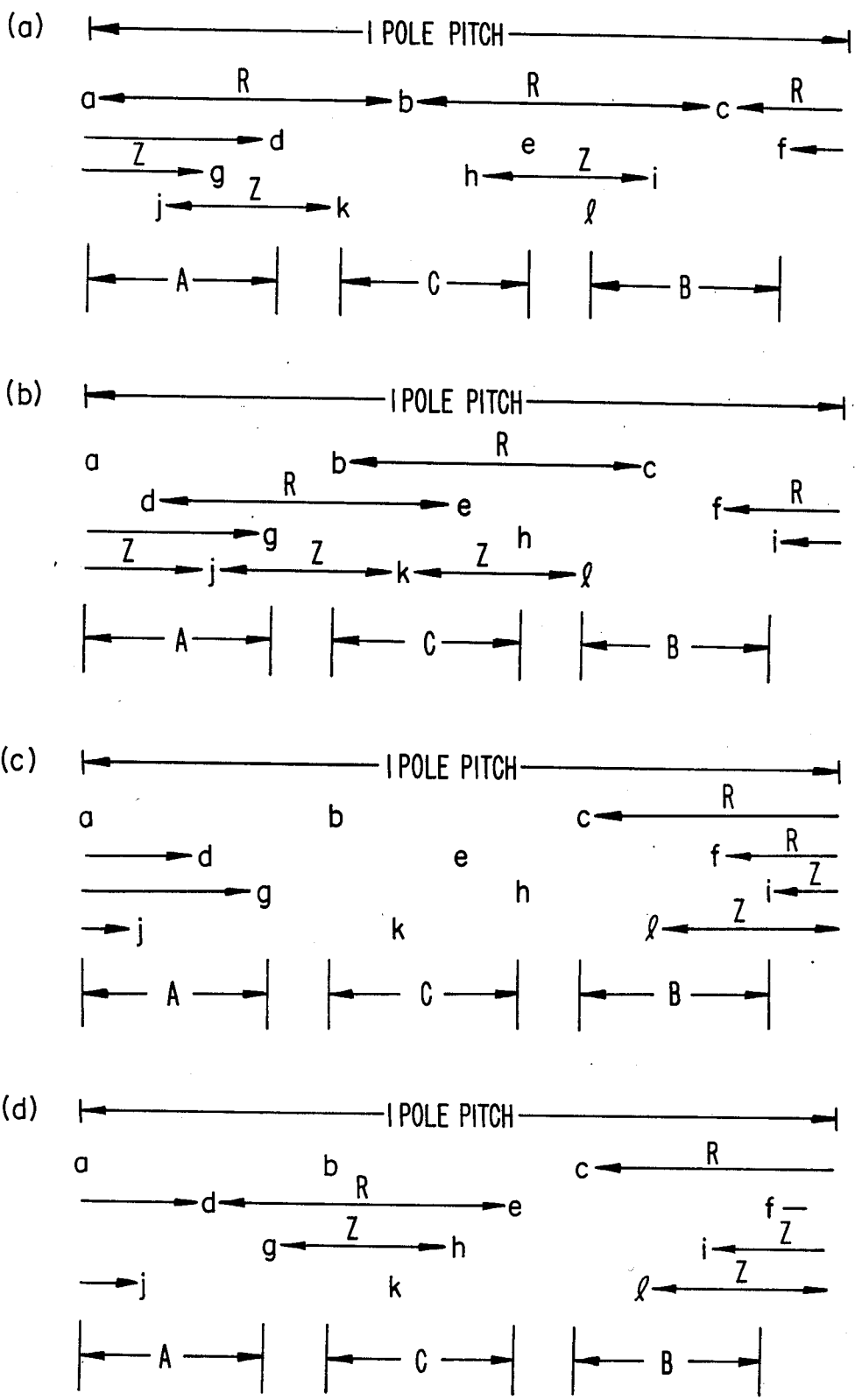
FIGS. 19(a) to (d) shows other arrangements of the winding slots of the armature core shown in FIG. 14 according to the present invention.

Other constructions of the rotating electric motor of the present invention having reduced cogging torque are shown in FIG. 19(a) to FIG. 19(d). FIG. 19(a) shows another arrangement of the winding slots a to l of the armature core 44 shown in FIG. 14 and FIG. 15. The positions of the long-teeth, the short-teeth and the standard-teeth are different from the armature core 44 of FIG. 15. That is, the teeth a-b,b-c and c-d are long-teeth, the teeth f-g,h-i and j-k are short-teeth and the other teeth are standard-teeth. The armature core has only one long-block and short-block, for example, the lower-block <a,f> and the short-block <f,a>. The effective pitch of the long-teeth is equal to $D(1+1/P)=37.5$ degrees, and the effective pitch of the short-teeth is equal to $D(1-1/P)=22.5$ degrees. So, Q=P=4, G=1 and J=1.

FIG. 19(b) shows another arrangement of the winding slots a to l of the armature core 44 shown in FIG. 14 and FIG. 15. The positions of the long-teeth, the short-teeth and the standard-teeth are different from the armature core 44 of FIG. 15. That is, the teeth b-c,d-e and f-g are long-teeth, the teeth i-j,j-k and k-l are short-teeth and the other teeth are standard-teeth. The armature core has only one long-block and short-block, for example, the long-block <a,g> and the short-block <g,a>. The effective pitch of the long-teeth is equal to $D(1+1/P)=37.5$ degrees, and the effective pitch of the short-teeth is equal to $D(1-1/P)=22.5$ degrees. So, Q=P=4, G=1 and J=1.

FIG. 19(c) shows still another arrangement of the winding slots a to l of the armature core 44 shown in FIG. 14 and FIG. 15. The positions of the long-teeth, the short-teeth and the standard-teeth are different from the armature core 44 of FIG. 15. That is, the teeth c-d and f-g are long-teeth, the teeth i-j and l-a are short-teeth and the other teeth are standard-teeth. The armature core has only one long-block and short-block, for example, the long-block <a,g> and the short-block <g,a>. The effective pitch of the long-tooth c-d is equal to $D(1+2/P)=45$ degrees, the effective pitch of the long-teeth f-g is equal to $D(1+1/P)=37.5$ degrees, the effective pitch of the short-tooth i-j is equal to $D(1-2/P)=15$ degrees, and the effective pitch of the short-tooth l-a is equal to $D(1-1/P)=22.5$ degrees. So, Q=P=4, G=1 or 2, and J=1 or 2.

FIG. 19(d) shows another arrangement of the winding slots a to l of the armature core 44 shown in FIG. 14 and FIG. 15. The positions of the long-teeth, the short-teeth and the standard-teeth are different from the armature core 44 of FIG. 15. That is, the teeth c-d and d-e are long-teeth, the teeth g-h, i-j and l-a are short-teeth and the other teeth are standard-teeth. The armature core has only one long-block and short-block, for example, the long-block <a,g> and the short-block <g,a>. The effective pitch of the long-tooth c-d is equal to $D(1+2/P)=45$ degrees, the effective pitch of the long-tooth d-e is equal to $D(1+1/P)=37.5$ degrees, and the effective pitch of the short-teeth g-h,i-j and l-a is equal to $D(1-1/P)=22.5$ degrees. So, Q=P=4, G=1 or 2, and J=1.

Figure 20:
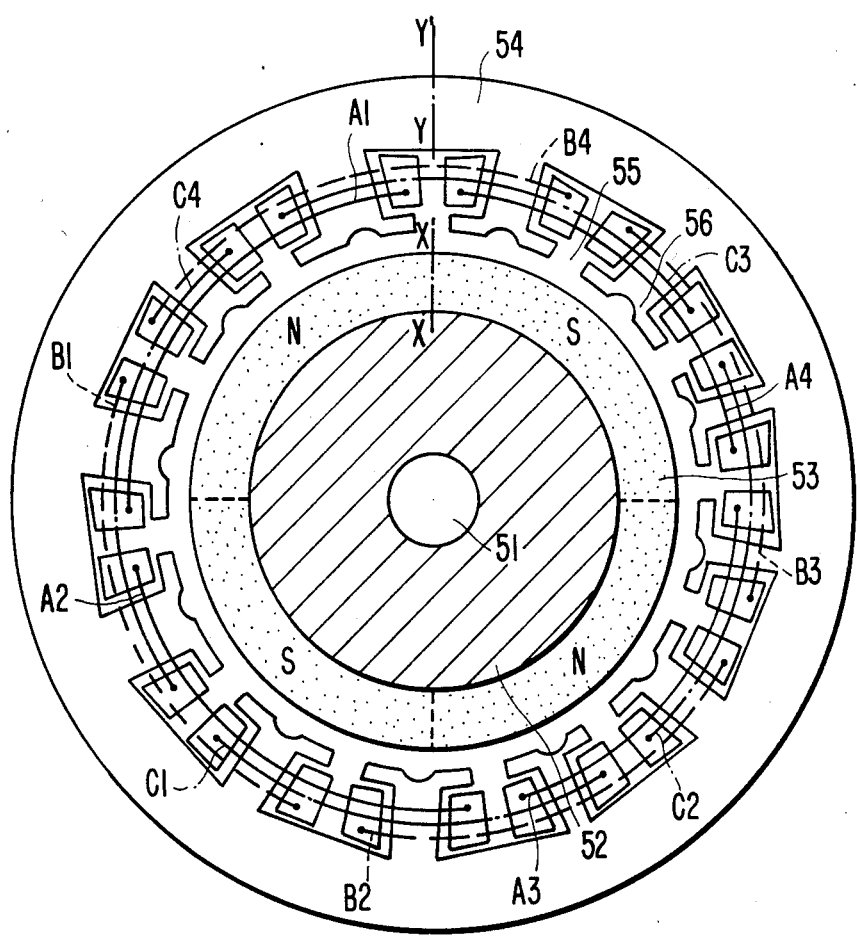
FIG. 20 is a schematic sectional view of another embodiment of the rotating electric motor of the present invention with the relationship T=3P.
Figure 21:
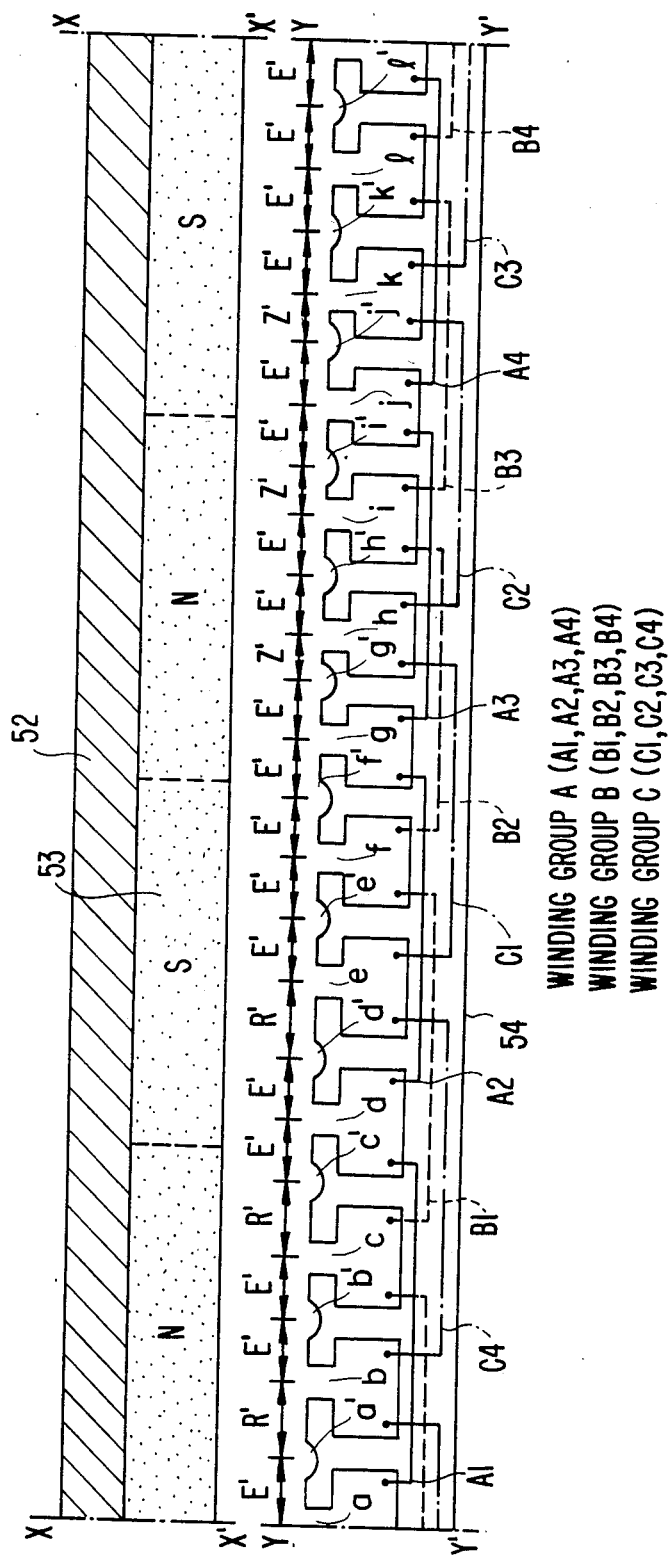
FIG. 21 shows a development view of the rotating electric motor of the present invention of FIG. 20 developed at the lines X—X' and Y—Y'.

FIG. 20 and FIG. 21 show another brushless DC motor of the invention with the relationship T=3P, which also corresponds to the conventional rotating electric motor shown in FIG. 3 and FIG. 4. FIG. 20 is a schematic sectional view of the brushless DC motor of the present invention. In FIG. 20, a cylindrical permanent magnet 53 is fixed to the outer circumference of a rotor 52 made of a magnetic material, and the permanent magnet 53 rotates with the rotor 52 around a rotary axis 51. The permanent magnet 53 has 4 poles of alternating N and S poles positioned apart by equal angles of 90 degrees, that is, P=4. The distribution of the magnetic flux density of the permanent magnet 53 is the same as that shown in FIG. 6. The teeth 56 of an armature core 54, each of which is formed between two adjacent winding slots 55, are faced to the poles of the permanent magnet 53. The rotary axis 51 of the rotor 52 is rotatably supported by the armature core 54. Therefore, the relative position between the teeth 56 of the armature core 54 and the poles of the permanent magnet 53 changes according to the rotation of the rotor 52.

FIG. 21 shows a development view of the brushless DC motor of the invention of FIG. 20 developed at the lines X—X' and Y—Y', when these lines are in a line. The armature core 54 has 12 of the winding slots a, b, c, d, e, f, g, h, i, j, k and l, and 12 of the teeth is provided between two adjacent winding slots, that is, T=12. The armature core 54 also has 12 of the dummy-slot portions a',b',c',d',e',f',g',h',i',j',k' and l' at the faces of the teeth opposed to the permanent magnet 53, and no coils are wound in the dummy-slot portions. The number of the dummy-slot portions is Td=12. Overlapping winding cols A1, A2, A3, A4, B1, B2, B3, B4, C1, C2, C3 and C4 are wound in the winding slots a to l. Each of the winding coils A1 to C4 encircles 3 of the teeth of the armature core 54. That is, A1 is wound in the winding slots a and d, A2 is wound in the winding slots d and g, A3 is wound in the winding slots g and j, A4 is wound in the winding slots j and a, B1 is wound in the winding slots c and f, B2 is wound in the winding slots f and i, B3 is wound in the winding slots i and l, B4 is wound in the winding slots l and c, C1 is wound in the winding slots e and h, C2 is wound in the winding slots h and k, C3 is wound in the winding slots k and b, and C4 is wound in the winding slots b and e. The winding coils A1,A2,A3 and A4 are connected serially to form a winding group A of the first phase, the winding coils B1,B2,B3 and B4 are connected serially to form a winding group B of the second phase, and the winding coils C1,C2,C3 and C4 are connected serially to form a winding group C of the third phase. As described after, the phase differences among the winding groups A,B and C are exactly equal to 120el degrees (electrical degree), where 180el is equivlent to 1 pole pitch (360/P) degrees. In FIG. 20, if P=4, then 180el is equivalent to 90 degrees (mechnical degrees), which is the same as that of the conventional motor of FIG. 3. Therefore, a torque accelerating the rotor 52 is obtained by supplying three phase currents to the three phase winding groups A, B and C. The electronic distributor 30 shown in FIG. 8 is also usable for the brushless DC motor of the present invention of FIG. 20.

The armature core 54 has 24 of tooth-segments, each of which is formed between two adjacent winding slots a to l and the dummy-slot portions a' to l'. In FIG. 21, since the winding slots a to l and the dummy-slot portions a' to l' are positioned apart by unequal angles, the effective pitches of the tooth-segments are not the same, where the effective pitch of a tooth-segment is defined as an angle between the centers of entrance parts of the winding slot and the dummy slot forming the tooth-segment. In the case of $Tt=T+Td=24$, the standard effective pitch of a tooth-segment is $D=(360/Tt)=15$ degrees when all of the winding slots and the dummy-slot portions are positioned apart by equal angles. So, a tooth-segment having an effective pitch equal to D is called a standard-segment, and a tooth-segment having an effective pitch smaller than D is called a short-segment, and a tooth-segment having an effective pitch larger than D is called a long-segment. A tooth-segment is designated by two of the winding slots and the dummy-slot portions forming the tooth-segment. For example, the tooth-segment a-a' means the tooth-segment formed by the winding slot a and the dummy-slot portion a'. In FIG. 21, the tooth-segments a-a',b-b',b'-c,c'-d,d-d',e-e',e'-f,f-f',f'-g,g-g',h-h',h'-i,i'-j,j-j',k-k',k'-l,l-l' and l'-a are standard-segments, and the tooth-segments a'-b,c-c' and d'-e are long-segments, and the tooth-segments g'-h,i-i' and j'-k are short-segments. In FIG. 21 and in other figures, the standard-segment, the long-segment and the short-segment are designated by E', R' and Z', respectively.

A block, having at least one long-segment, and at least one standard-segment and no short-segment positioned sequentially, is called a long-block, and a block, having at least one short-segment, and at least one standard-segment and no long-segment positioned sequentially, is called a short-block in this case. A block is designated by the winding slots or the dummy-slot portions positioned at either sides of the block. The armature core 54 has only one long-block and one short-block alternatively positioned arouned the rotary axis 51, for example, the long-block <a,f'> and the short-block <f',a>. The long-block <a,f'> has 3 long-segments of a'-b,c-c' and d'-e and 8 standard-segments of a-a',b-b',b'-c,c'-d,d-d',e-e',e'-f and f-f'. The short-block <f',a> has 3 short-segments of g'-h,i-i' and j'-k and 10 standard-segments of f'-g,g-g',h-h',h'-i,i'-j,j-j',k-k',k'-l,l-l' and l'-a. Each of the effective pitches of the long-segments a'-b,c-c' and d'-e is equal or nearly equal to $D(1+1/P)=18.75$ degrees, each of the effective pitches of the short-segments g'-h,i-i' and j'-k is equal or nearly equal to $D(1-1/P)=11.25$ degrees. Notice that the standard-segments positioned between neighboring long-segments and short-segments can belong to either a long-block or short-block, for that is not important in order to distinguish the existence of a long-block or a short-block.

Figure 22:
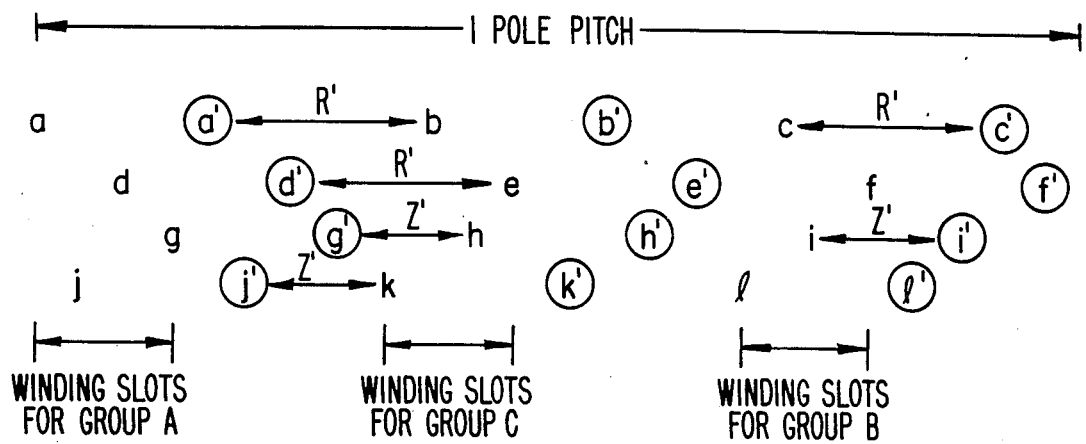
FIG. 22 shows phases of the winding slots and the dummy-slot portions of the armature core with a period of 1 pole pitch of the permanent magnet about the rotating electric motor of the present invention shown in FIG. 20 and FIG. 21.

Next, the cogging torque of the embodiment of the present invention shown in FIG. 20 is explained hereinbelow. FIG. 22 shows phases of the winding slots a to l and the dummy-slot portions a' to l' of the armature core 54 with the period of the 1 pole pitch of the permanent magnet 53. The winding slots a,d,g and j, where the winding coils A1,A2,A3 and A4 of the winding group A are wound, and the dummy-slot portions a',d',g' and j' are positioned apart by a phase difference of (1 pole pitch)/24. That is, the phases of the winding slots a,d,g and j and the dummy-slot portions a',d',g' and j' differ from each other by (1 pole pitch)/24, and the range of the phases of the winding slots a,d,g and j is smaller than (1 pole pitch)3. Similarly, the winding slots c,f,i and l, where the winding coils B1,B2,B3 and B4 of the winding group B are wound, and the dummy-slot portions c',f',i' and l' are positioned apart by the same phase difference of (1 pole pitch)/24, and the range of the phases of the winding slots c,f,i and l is smaller than (1 pole pitch)/3. Similarly, the winding slots b,e,h and k, where the winding coils C1,C2,C3 and C4 of the winding group C are wound, and the dummy-slot portions b',e',h' and k' are positioned apart by the same phase difference of (1 pole pitch)/24, and the range of the phases of the winding slots b,e,h and k is smaller than (1 pole pitch)/3. Furthermore, the phase differences among the winding slot group (a,d,g,j) for the winding group A, the winding slot group (c,f,i,l) for the winding group B and the winding slot group (b,e,h,k) for the winding group C are exactly equal to (1 pole pitch)/3. As the result of this, the phase differences among the three phase winding group A,B and C are exactly equal to 120el degrees, and a smooth torque is obtained by using the distributor 30 of FIG. 8.

Figure 23:
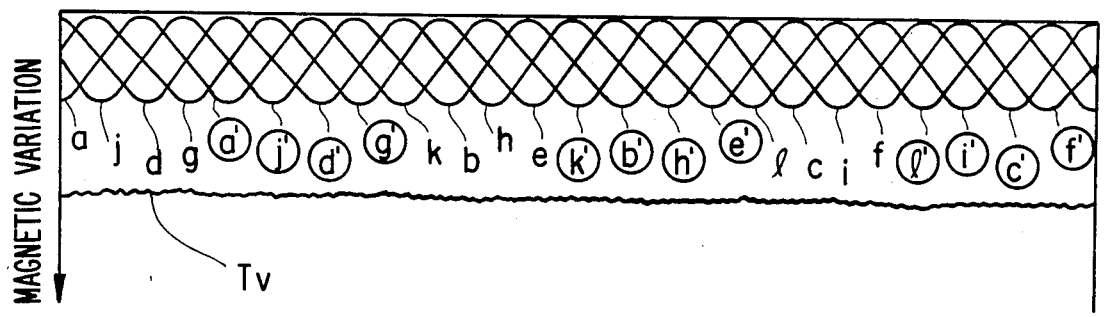
FIG. 23 shows a composite magnetic variation of the rotating electeic motor of the present invention shown in FIG. 20 and FIG. 21.

All of the phases of the winding slots a to l and the dummy-slot portions a' to l' are different by the phase difference of (1 pole pitch)24, and it is expected that the composite magnetic variation with a period of 1 pole pitch becomes small. FIG. 23 shows waveforms of the magnetic variations of the winding slots a to l and the dummy-slot portions a' to l' and a waveform of the composite magnetic variation Tv of the armature core 54. The magnetic variation of each of the winding slots and dummy-slot portions changes smoothly corresponding to the each opening width, and each of the dummy-slot portions a',b',c',d',e',f',g',h',i',j',k' and l' has same magnetic effect as that of each of the winding slots a to l. Since the phases of the winding slots and the dummy-slot portions differ by (1 pole pitch)/24, the composite magnetic variation Tv becomes very small. Comparing the composite magnetic variation Tv of FIG. 23 with the composite magnetic variation Tv' of FIG. 18. The Tv of the motor of the present invention is much smaller than the Tv' of the conventional motor. Therefore, the embodiment of the brushless DC motor of the invention present shown in FIG. 20 has a lower cogging torque.

In the case of the above embodiment of FIG. 20, each of the teeth has a dummy-slot portion, but the construction of the rotating electric motor of the present invention having a reduced cogging torque is not limited such a case. Generally speaking, the cogging torque can be reduced by providing a rotating electric motor which comprises a field permanent magnet member of a circular form and an armature core made of a magnetic material, said magnet member having parmanently magnetized N and S poles alternately positioned around the rotary axis of said rotary electric motor, the number of said N and S pole is P which is an even number, said armature core having a plurality of teeth made between two adjacent winding slots where a plurality of overlapping winding coils of polyphase winding groups are wound, the number of said teeth is T which is not less than 2P, and the number of the phases of said polyphase winding groups is H which is not less than 2, wherein at least one of said teeth has at least one dummy-slot portion opposed to the poles of said magnet member, a plurality of tooth-segments are formed between two adjacent winding slots and dummy-slot portions, the number of said tooth-segments is Tt which is larger than T, said armature core has at least one short-block and one long-block alternately positioned around said rotary axis, each of said short-blocks has at least one short-segment, and at least one standard-segment and no long-segments, and each of said long-blocks has at least one long-segment, and at least one standard-segment and no short-segments, where the effective pitch of said standard-segments is equal to $D=(360/Tt)$ degrees, each of the effective pitches of said short-segments is smaller than D, and each of the effective pitches of said long-segments is larger than D.

It is preferable that the whole effective pitch of 1 pair of adjacent short-blocks and long-blocks is equal or almost equal to $(360/P)Q$ degrees, where Q is an integer not less than 2, each of the effective pitches of said short-segments in said 1 pair of adjacent short-block and long-block is equal or almost equal to $D(1-J/Q)$ degrees, and each of the effective pitches of said long-segments in said 1 pair of adjacent short-blocks and long-blocks is equal or almost equal to $D(1+G/Q)$ degrees, where J and G are integers not less than 1 and not larger than $Q/2$ and preferably $J=G=1$. It is also preferable that the number of said short-segments in said short-block is not less than 2, and the number of said long-segments in said long-block is not less than 2. It is also preferable that the number of said short-segments in said short-block is equal to the number of said long-segments in said long-block, which is less than Q and preferably equal to $Q-1$. It is also preferable that each of said long-segments is adjacent to two of said standard-segments at either side thereof, and each of said short-segments is adjacent to two of said standard-segments at either side thereof.

Figure 24:
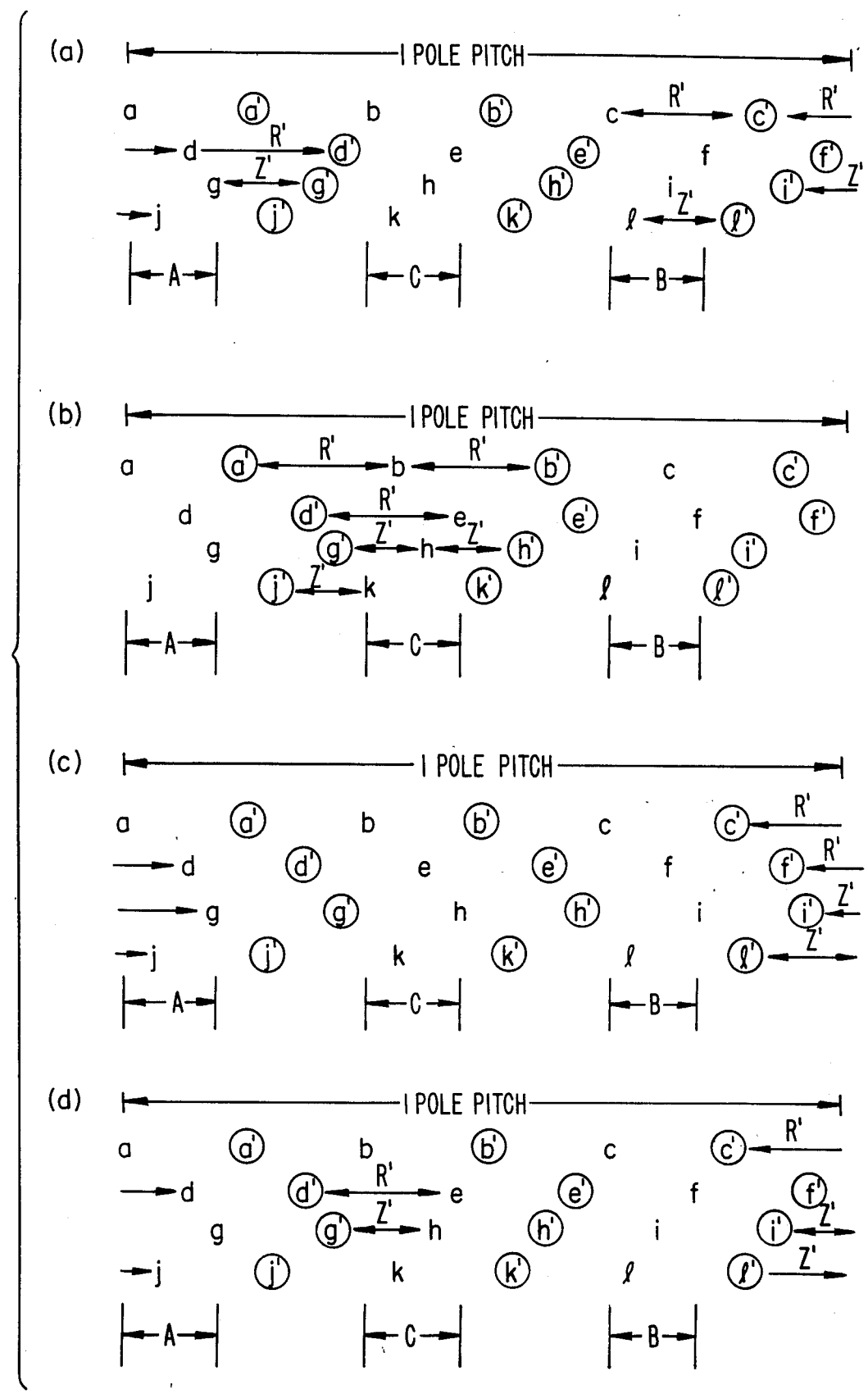
FIG. 24(a) to (d) shows other arrangements of the winding slots and the dummy-slot portions of the armature core shown in FIG. 20 according to the present invention.

Other constructions of the rotating electric motor of the present invention having a reduced cogging torque are shown in FIG. 24(a) to FIG. 24(d). FIG. 24(a) shows another arrangement of the winding slots a to l and the dummy-slot portions a' to l' of the armature core 54 shown in FIG. 20 and FIG. 21. The positions of the long-segments, the short-segments and the standard-segments are different from the armature core 54 of FIG. 21. That is, the tooth-segments c-c',c'-d and d-d' are long-segments, the tooth-segments g-g',i'-j and l-l' are short-segments and the other tooth-segments are standard-segments. The armature core has only one long-block and one short-block, for example, the long-block $<a,f>$ and the short-block $<f,a>$. The effective pitch of the long-segments is equal to $D(1+1/P)=18.75$ degrees, and the effective pitch of the short-segments is equal to $D(1-1/P)=11.25$ degrees. So, $Q=P=4$, $G=1$ and $J=1$.

FIG. 24(b) shows another arrangement of the winding slots a to l and the dummy-slot portions a' to l' of the armature core 54 shown in FIG. 20 and FIG. 21. The positions of the long-segments, the short-segments and the standard-segments are different from the armature core 54 of FIG. 21. That is, the tooth-segments a'-b,b-b' and d'-e are long-segments, the tooth-segments g'-h,h-h' and j'-k are short-segments and other tooth-segments are standard-segments. The armature core has only one long-block and short-block, for example, the long-block $<a,g>$ and the short-block $<g,a>$. The effective pitch of the long-segments is equal to $D(1+1/P)=18.75$ degrees, and the effective pitch of the short-segments is equal to $D(1-1/P)=11.25$ degrees. So, $Q=P=4$, $G=1$ and $J=1$.

FIG. 24(c) shows still another arrangement of the winding slots a to l and the dummy-slot portions a' to l' of the armature core 54 shown in FIG. 20 and FIG. 21. The positions of the long-segments, the short-segments and the standard-segments are different from the armature core 54 of FIG. 21. That is, the tooth-segments c'-d and f'-g are long-segments, the tooth-segments i'-j and l'-a are short-segments and the other tooth-segments are standard-segments. The armature core has only one long-block and short-block, for example, the long-block $<a,g>$ and the short-block $<g,a>$. The effective pitch of the long-segment c'-d is equal to $D(1+2/P)=22.5$ degrees, the effective pitch of the long-segment f'-g is equal to $D(1+1/P)=18.75$ degrees, the effective pitch of the short-segment i'-j is equal to $D(1-2/P)=7.5$ degrees, and the effective pitch of the short-segment l'-a is equal to $D(1-1/P)=11.25$ degrees. So, $Q=P=4$, $G=1$ or 2, and $J=1$ or 2.

FIG. 24(d) shows another arrangement of the winding slots a to l and the dummy-slot portions a' to l' of the armature core 54 shown in FIG. 20 and FIG. 21. The positions of the long-segments, the short-segments and the standard-segments are different from the armature core 54 of FIG. 21. That is, the tooth-segments c'-d and d'-e are long-segments, the tooth-segments g'-h,i'-j and l''-a are short-segments and the other tooth-segments are standard-segments. The armature core has only one long-block and one short-block, for example, the long-block $<a,g>$ and the short-block $<g,a>$. The effective pitch of the long-segment c'-d is equal to $D(1+2/P)=22.5$ degrees, the effective pitch of the long-segment d'-e is equal to $D(1+1/P)=18.75$ degrees, and the effective pitch of the short-segments g'-h,i'-j and l'-a is equal to $D(1-1/P)=11.25$ degrees. So, $Q=P=4$, $G=1$ or 2, and $J=1$.

As shown in FIG. 24(d), the number of the long-segments is not to be equal to that of the short-segments. Generally speaking, the cogging torque can be reduced by providing a rotating electric motor which comprises a field permanent magnet member of a circular form and an armature core made of a magnetic material, said magnet member having permanently magnetized N and S poles alternately positioned around the rotary axis of said rotary electric motor, the number of said N and S poles is P which is an even number, said armature core having a plurality of teeth arranged between two adjacent winding slots where a plurality of overlapping winding coils of polyphase winding groups are wound, the number of said teeth is T which is not less than 2P, and the number of the phases of said polyphase winding groups is H which is not less than 2, wherein at least one of said teeth has at least one dummy-slot portion opposed to the poles of said magnet member, a plurality of tooth-segments are formed between adjacent two of said winding slots and said dummy-slot portions, the number of said tooth-segments is Tt which is larger than T, said winding slots and said dummy-slot portions are positioned at unequal angles so that the number of the phases of said winding slots and said dummy-slot portions with a period of 1 pole pitch of said magnet member is larger than 2H(Tt/T).

It is preferable that all of the phases of the winding slots and the dummy-slot portions with the period of the 1 pole pitch of said magnetic member are different from each other preferably by an equal angle of (1 pole pitch)/Tt.

What is claimed is:

1. A rotating electric motor comprising:
   a field permanent magnet member having permanently magnetized N and S poles alternately positioned in a substantially circular form around a rotary shaft of said rotating electric motor, said member having P poles, wherein P is an even number which is at least equal to 4; and
   an armature core of a magnetic material having a plurality of teeth disposed between respective adjacent winding slots of a plurality of winding slots wherein a plurality of overlapping winding coils of polyphase winding groups are wound, said teeth being opposed to said poles of said magnet member, said core having T teeth, wherein T is an integral multiple of P and at least equal to 2P, and wherein said motor has H polyphase winding groups, wherein H is at least equal to 2;
   wherein said teeth of said armature core are composed of standard-teeth each having an effective pitch $D=(360/T)$ degrees, and short-teeth each having an effective pitch smaller than D, and long-teeth each having an effective pitch larger than D, where the effective pitch of a tooth is defined by an angle between centers of entrance parts of two adjacent winding slots forming the tooth; and
   wherein said teeth of said armature core form, alternately around said rotary shaft, at least a short-block having only short-teeth and standard-teeth including at least two of said short-teeth and at least one of said standard-teeth, and a long-block having only long-teeth and standard-teeth including at least two of said long-teeth and at least one of said standard-teeth.

2. A rotating electric motor as claimed in claim 1, wherein T is an integral multiple of H multiplied by P.

3. A rotating electric motor as claimed in claim 1, wherein said short-block has less than P short-teeth, and said long-block has less than P long-teeth.

4. A rotating electric motor as claimed in claim 3, wherein said armature core has only one short-block and only one long-block, said short-block having (P−1) short-teeth, and said long-block having (P−1) long-teeth.

5. A rotating electric motor as claimed in claim 1, wherein the effective pitch of said short-teeth equal to $D(1-J/Q)$ degrees, and the effective pitch of each of said long-teeth is equal to $D(1+G/Q)$ degrees, where Q is an integer at least equal to 2, and J and G are positive integers which are less than or equal to Q/2.

6. A rotating electric motor as claimed in claim 5, wherein J=1 and G=1.

7. A rotating electric motor as claimed in claim 5, wherein Q=P.

8. A rotating electric motor as claimed in claim 1, wherein the number of said short-teeth and the number of said long-teeth in said armature core are each less than P.

9. A rotating electric motor as claimed in claim 8, wherein the number of said short-teeth and the number of said long-teeth in said armature core are each equal to P−1.

10. A rotating electric motor as claimed in claim 1, wherein each of said long-teeth is adjacent to at least one of said standard-teeth, and each of said short-teeth is adjacent to at least one of said standard-teeth.

11. A rotating electric motor as claimed in claim 10, wherein each of said long-teeth is between two adjacent standard-teeth, and each of said short-teeth is between two adjacent standard-teeth.

12. A rotating electric motor as claimed in claim 1, wherein centers of entrance parts of said winding slots are positioned at unequal angles around said rotary shaft so that more than 2(T/P) of the centers of entrance parts of said winding slots in one pole pitch are at different phases.

13. A rotating electric motor as claimed in claim 12, wherein all of the centers of entrance parts of said winding slots in one pole pitch are at different phases with respect to each other.

14. A rotating electric motor as claimed in claim 13, wherein all of the centers of entrance parts of said winding slots in one pole pitch are at phases which are different by 1/T of one pole pitch.

15. A rotating electric motor comprising:
   a field permanent magnet member having permanently magnetized N and S poles alternately positioned in a substantially circular form around a rotary shaft of said rotating electric motor, said member having P poles, wherein P is an even number which is at least equal to 4; and
   an armature core of a magnetic material having a plurality of teeth disposed between respective adjacent winding slots of a plurality of winding slots wherein a plurality of overlapping winding coils of polyphase winding groups are wound, said teeth being opposed to said poles of said magnet member, said core having T teeth, wherein T is an integral multiple of P and at least equal to 2P, and wherein said motor has H polyphase winding groups, wherein H is at least equal to 2;
   wherein centers of entrance parts of said winding slots are positioned around said rotary shaft at unequal angles so that more than 2(T/P) of the centers of entrance parts of said winding slots in one pole pitch are at different phases.

16. A rotating electric motor as claimed in claim 15, wherein all of the centers of entrance parts of said winding slots in one pole pitch are at different phases.

17. A rotating electric motor as claimed in claim 16, wherein all of the centers of entrance parts of said winding slots in one pole pitch are at phases which are different by 1/T of one pole pitch.

18. A rotating electric motor as claimed in claim 15, wherein said teeth of said armature core are composed of short-teeth each having an effective pitch smaller than $D=(360/T)$ degrees and long-teeth each having an effective pitch larger than D, where the effective pitch of a tooth is defined by an angle between the centers of entrance parts of two adjacent winding slots forming the tooth.

19. A rotating electric motor as claimed in claim 18, wherein said teeth of said armature core form at least a short-block and a long-block alternately positioned around said rotary shaft, where said short-block has only at least one of said short-teeth, and said long-block has only at least one of said long-teeth.

20. A rotating electric motor as claimed in claim 19, wherein said short-block is composed of at least two of said short-teeth, and said long-block is composed of at least two of said long-teeth.

21. A rotating electric motor as claimed in claim 18, wherein the number of said short-teeth is less than P and the number of said long-teeth is less than P.

22. A rotating electric motor as claimed in claim 18, wherein the number of said short-teeth is (P−1) and the number of said long-teeth is (P−1).

23. A rotating electric motor as claimed in claim 18, wherein the effective pitch of each of said short-teeth is equal to D(1−J/Q) degrees, and the effective pitch of each of said long-teeth is equal to D(1+G/Q) degrees, where Q is an integer at least equal to 2, and J and G are positive integers less than or equal to Q/2.

24. A rotating electric motor as claimed in claim 23, wherein J=1 and G=1.

25. A rotating electric motor as claimed in claim 23, wherein Q=P.

26. A rotating electric motor as claimed in claim 15, wherein H=3.

27. A rotating electric motor as claimed in claim 15, wherein T is an integral multiple of H multiplied by P.

28. A rotating electric motor comprising:
a field permanent magnet member having permanently magnetized N and S poles alternately positioned in a substantially circular form around a rotary shaft of said rotating electric motor, said member having P poles, wherein P is an even number which is at least equal to 4; and
an armature core of a magnetic material having a plurality of teeth disposed between respective adjacent winding slots of a plurality of winding slots wherein a plurality of overlapping winding coils of polyphase winding groups are wound, said teeth being opposed to said poles of said magnet member, said core having T teeth, wherein T is an integral multiple of P and at least equal to 2P, and wherein said motor has H polyphase winding groups, wherein H is at least equal to 2;
wherein said armature core has at least two dummy-slot portions opposed to said poles of said magnet member so as to form a plurality of tooth-segments, each of said dummy-slot portions being disposed on one tooth of said teeth so that said one tooth is divided to two of said tooth-segments, said core having Tt tooth-segments, wherein Tt is larger than T;
wherein said tooth-segments are composed of standard-segments each having an effective pitch D=(360/Tt), and long-segments each having an effective pitch larger than D and short-segments each having an effective pitch smaller than D so as to form at least a short-block and a long-block alternately positioned around said rotary shaft, wherein the effective pitch of a tooth-segment is defined by an angle between centers of entrance parts of an adjacent one of said winding slots and an adjacent one of said dummy-slot portions forming the tooth-segment; and
wherein said short-block has only said short-segments and at least one of said standard-segments, and said long-block has only said long-segments and at least one of said standard-segments.

29. A rotating electric motor as claimed in claim 28, wherein T is an integral multiple of H multiplied by P.

30. A rotating electric motor as claimed in claim 28, wherein the number of said short-segments in said short-block is less than P, and the number of said long-segments in said long-block is less than P.

31. A rotating electric motor as claimed in claim 30, wherein said armature core has only one short-block and only one long-block, said short-block having (P−1) short-segments, and said long-block having (P−1) long-segments.

32. A rotating electric motor as claimed in claim 28, wherein the effective pitch of each of said short-segments is equal to D(1−J/Q) degrees, and the effective pitch of each of said long-segments is equal to D(1+G/Q) degrees, where Q is an integer at least equal to 2, and J and G are positive integers less than or equal to Q/2.

33. A rotating electric motor as claimed in claim 32, wherein J=1 and G=1.

34. A rotating electric motor as claimed in claim 32, wherein Q=P.

35. A rotating electric motor as claimed in claim 28, wherein the number of said short-segments and the number of said long-segments in said armature core are each less than P.

36. A rotating electric motor as claimed in claim 35, wherein the number of said short-segments and the number of said long-segments in said armature core are each equal to P−1.

37. A rotating electric motor as claimed in claim 28, wherein each of said long-segments is adjacent to at least one of said standard-segments, and each of said short-segments is adjacent to at least one of said standard-segments.

38. A rotating electric motor as claimed in claim 37, wherein each of said long-segments is between two adjacent standard-segments, and each of said short-segments is between two adjacent standard-segments.

39. A rotating electric motor as claimed in claim 28, wherein the centers of entrance parts of said winding slots and said dummy-slot portions are positioned at unequal angles around said rotary shaft so that more than 2(Tt/P) of the centers of entrance parts of said winding slots and said dummy-slot portions in one pole pitch are at different phases.

40. A rotating electric motor as claimed in claim 39, wherein all of the centers of entrance parts of said winding slots and said dummy-slot portions in one pole pitch are at different phases with respect to each other.

41. A rotating electric motor as claimed in claim 4, wherein all of the centers of entrance parts of said winding slots and said dummy-slot portions in one pole pitch are at phases which are different by 1/Tt of one pole pitch.

42. A rotating electric motor comprising:
a field permanent magnet member having permanently magnetized N and S poles alternately positioned in a substantially circular form around a rotary shaft of said rotating electric motor, said member having P poles, wherein P is an even number which is at least equal to 4; and
an armature core of a magnetic material having a plurality of teeth disposed between respective adjacent winding slots of a plurality of winding slots wherein a plurality of overlapping winding coils of polyphase winding groups are wound, said teeth being opposed to said poles of said magnet member, said core having T teeth, wherein T is an integral multiple of P and at least equal to 2P, and wherein said motor has H polyphase winding groups, wherein H is at least equal to 2;

wherein said armature core has at least two dummy-slot portions opposed to said poles of said magnet member so as to form a plurality of tooth-segments, each of said dummy-slot portions being disposed on one tooth of said teeth so that said one tooth is divided to two of said tooth-segments, said core having Tt tooth-segments, wherein Tt is larger than T;

wherein centers of entrance parts of said winding slots and said dummy-slot portions are positioned at unequal angles around said rotary shaft so that more than 2(Tt/P) of the centers of entrance parts of said winding slots and said dummy-slot portions in one pole pitch are at different phases.

43. A rotating electric motor as claimed in claim 42, wherein all of the centers of entrance parts of said winding slots and said dummy-slot portions in one pole pitch are at different phases with respect to each other.

44. A rotating electric motor as claimed in claim 43, wherein all of the centers of entrance parts of said winding slots and said dummy-slot portions in one pole pitch are at phases which are different by 1/Tt of one pole pitch.

45. A rotating electric motor as claimed in claim 42, wherein said tooth-segments includes short-segments and long-segments, each of said short-segments having an effective pitch smaller than $D=(360/Tt)$ degrees, and each of said long-segments has an effective pitch larger than D, where the effective pitch of a tooth-segment is defined by an angle between centers of entrance parts of an adjacent one of said winding slots and an adjacent one of said dummy-slot portions forming the tooth-segment.

46. A rotating electric motor as claimed in claim 45, wherein said armature core has at least a short-block and a long-block alternately positioned around said rotary shaft, where said short-block has only at least one of said short-segments, and said long-block has only at least one of said long-segments.

47. A rotating electric motor as claimed in claim 46, wherein said short-block has at least two of said short-segments, and said long-block has at least two of said long-segments.

48. A rotating electric motor as claimed in claim 45, wherein the number of said short-segments is less than P, and the number of said long-segments is less than P.

49. A rotating electric motor as claimed in claim 45, wherein the number of said short-segments is equal to (P−1), and the number of said long-segments is equal to (P−1).

50. A rotating electric motor as claimed in claim 45, wherein the effective pitch of each of said short-segments is equal to $D(1-J/Q)$ degrees, and the effective pitch of each of said long-segments is equal to $D(1+G/Q)$ degrees, where Q is an integer at least equal to 2, and J and G are positive integers less than or equal to Q/2.

51. A rotating electric motor as claimed in claim 50, wherein J=1 and G=1.

52. A rotating electric motor as claimed in claim 50, wherein Q=P.

53. A rotating electric motor as claimed in claim 42, wherein H=3.

54. A rotating electric motor as claimed in claim 42, wherein T is an integral multiple of H multiplied by P.

55. A rotating electric motor as claimed in claim 42, wherein Tt is an integral multiple of P.

56. A rotating electric motor as claimed in claim 42, wherein Tt is an integral multiple of H multiplied by P.

57. A rotating electric motor comprising:
a field permanent magnet member having permanently magnetized N and S poles alternately positioned in a substantially circular form around a rotary shaft of said rotating electric motor, said member having P poles, wherein P is an even number which is at least equal to 4; and
an armature core of a magnetic material having a plurality of teeth disposed between respective winding slots of a plurality of winding slots wherein a plurality of overlapping winding coils of polyphase winding groups are wound, said teeth being opposed to said poles of said magnet member, said core having T teeth, wherein T is an integral multiple of P and at least equal to 2P, and wherein said motor has H polyphase winding groups, wherein H is at least equal to 2;
wherein said armature core has at least two short-teeth and at least two long-teeth so that more than 2(T/P) of centers of entrance parts of said winding slots in one pole pitch are at different phases; and
wherein each of said short-teeth has an effective pitch equal to $D(1-J/P)$ degrees, and each of said long-teeth has an effective pitch equal to $D(1+G/P)$ degrees, where D is (360/T) degrees, and J and G are positive integers less than or equal to P/2, where the effective pitch of a tooth is defined by an angle between centers of entrance parts of two adjacent winding slots forming the tooth.

58. A rotating electric motor comprising:
a field permanent magnet member having permanently magnetized N and S poles alternately positioned in a substantially circular form around a rotary shaft of said rotating electric motor, said member having P poles, wherein P is an even number which is at least equal to 4; and
an armature core of a magnetic material having a plurality of teeth forming between respective adjacent winding slots of a plurality of winding slots wherein a plurality of overlapping winding coils of polyphase winding groups are wound, said teeth being opposed to said poles of said magnet member, said core having T teeth wherein T is an integral multiple of P and at least equal to 2P, and wherein said motor has H polyphase winding groups, wherein H is at least equal to 2;
wherein said armature core has at least two dummy-slots opposed to said poles of said magnet member so as to form a plurality of tooth-segments, each of said dummy-slot portions being disposed on one tooth of said teeth so that said one tooth is divided to two of said tooth-segments, said core having Tt tooth-segments, wherein Tt is larger than T;
wherein said tooth-segments include at least two short-segments each having an effective pitch equal to $D(1-J/P)$ and at least two long-segments each having an effective pitch equal to $D(1+G/P)$ so that more than 2(Tt/P) of centers of entrance parts of said winding slots and said dummy-slot portions in one pole pitch are at different phases, where D is equal to (360/Tt) degrees, J and G are positive integers less than or equal to P/2, and the effective pitch of a tooth-segment is defined by an angle between centers of entrance parts of an adjacent one of said winding slots and an adjacent one of said dummy-slot portions forming the tooth-segment.

* * * * *